US012639883B2

(12) United States Patent
    Xia et al.

(10) Patent No.: US 12,639,883 B2
(45) Date of Patent: May 26, 2026

(54) IMAGE RENDERING

(71) Applicant: Tencent Technology (Shenzhen) Company Limited, Shenzhen (CN)

(72) Inventors: Fei Xia, Shenzhen (CN); Fei Ling, Shenzhen (CN); Yongxiang Zhang, Shenzhen (CN); Jun Deng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 135 days.

(21) Appl. No.: 18/378,778

(22) Filed: Oct. 11, 2023

(65) Prior Publication Data

US 2024/0037839 A1     Feb. 1, 2024

Related U.S. Application Data

(63) Continuation of application No. PCT/CN2022/134151, filed on Nov. 24, 2022.

(30) Foreign Application Priority Data

Feb. 25, 2022    (CN) .......................... 202210179700.6

(51) Int. Cl.
    *G06T 15/04*      (2011.01)
    *G06T 7/40*       (2017.01)
    *G06V 10/75*      (2022.01)

(52) U.S. Cl.
    CPC ................ *G06T 15/04* (2013.01); *G06T 7/40* (2013.01); *G06V 10/751* (2022.01)

(58) Field of Classification Search
    None
    See application file for complete search history.

(56) References Cited

U.S. PATENT DOCUMENTS

| | | | |
|---|---|---|---|
| 11,127,225 B1 | 9/2021 | Kowalski et al. | |
| 11,967,024 B2 * | 4/2024 | Munkberg | G06N 3/045 |
| 2021/0082185 A1 * | 3/2021 | Ziegler | G06T 15/50 |

(Continued)

FOREIGN PATENT DOCUMENTS

| | | |
|---|---|---|
| CN | 113963110 A | 1/2022 |
| CN | 114067042 A | 2/2022 |
| WO | 2020165557 A1 | 8/2020 |

OTHER PUBLICATIONS

Verhoeven, Geert J. "Computer graphics meets image fusion: the power of texture baking to simultaneously visualise 3D surface features and colour." ISPRS Annals of the Photogrammetry, Remote Sensing and Spatial Information Sciences 4 (2017): 295-302.*

(Continued)

*Primary Examiner* — Ryan M Gray
(74) *Attorney, Agent, or Firm* — Banner & Witcoff, Ltd.

(57)     ABSTRACT

This application provides an image rendering method and apparatus, an electronic device, a computer-readable storage medium, and a computer program product. The method comprises the following steps: acquiring texture data of a virtual object; performing differential fitting processing on the texture data to obtain fitted texture data; baking the fitted texture data into a texture image to obtain a rendered texture image; and performing, based on the rendered texture image, image rendering processing corresponding to the virtual.

20 Claims, 13 Drawing Sheets

(56) References Cited

U.S. PATENT DOCUMENTS

| 2021/0264662 A1* | 8/2021 | Bishop | G06T 15/506 |
| 2023/0140460 A1* | 5/2023 | Munkberg | G06N 3/045 |
| | | | 345/423 |

OTHER PUBLICATIONS

Hasselgren, Appearance Driven Automatic 3D Model Simplification (already of record).*
Feb. 15, 2015—(CN) International Search Report of PCT/CN2022/134151.
European search report. (Jun. 2, 2025). EP 22928314.8-1207, European Patent Office.
Jon Hasselgren et al: "Appearance-Driven Automatic 3D Model Simplification", arxiv.org, Cornell University Library, 201 Olin Library Cornell University Ithaca, Apr. 8, 2021 XP081936498.
Anonymous: "Baking", Modo 15.2vl User Guide Shading and Lighting, Jan. 16, 2022, pp. 1-8, XP093237267.

* cited by examiner

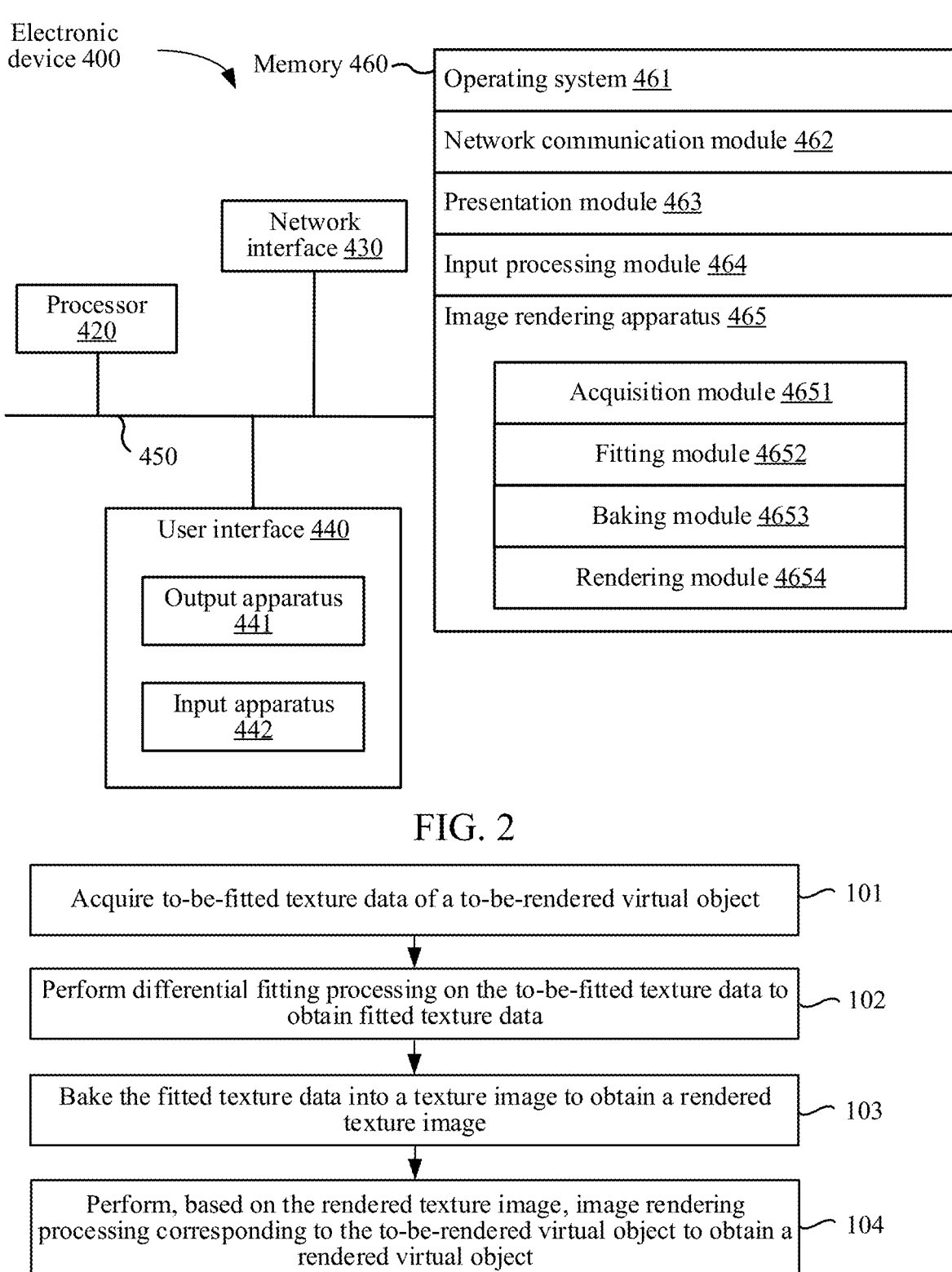

Electronic device 400

Memory 460

Operating system 461

Network communication module 462

Presentation module 463

Input processing module 464

Image rendering apparatus 465

Acquisition module 4651

Fitting module 4652

Baking module 4653

Rendering module 4654

Network interface 430

Processor 420

450

User interface 440

Output apparatus 441

Input apparatus 442

FIG. 2

| 101 | Acquire to-be-fitted texture data of a to-be-rendered virtual object |
| 102 | Perform differential fitting processing on the to-be-fitted texture data to obtain fitted texture data |
| 103 | Bake the fitted texture data into a texture image to obtain a rendered texture image |
| 104 | Perform, based on the rendered texture image, image rendering processing corresponding to the to-be-rendered virtual object to obtain a rendered virtual object |

FIG. 3A

Acquire to-be-fitted texture data of a to-be-rendered virtual object — 101

Perform differential fitting processing on the to-be-fitted texture data to obtain fitted texture data — 102

Perform standard rendering processing corresponding to the to-be-rendered virtual object to obtain a target rendering graph corresponding to the virtual object — 1021

Perform the following iterative processing: performing fitted rendering processing based on the to-be-fitted texture data to obtain a fitted rendering graph — 1022

Construct a rendering loss function based on the target rendering graph and the fitted rendering graph — 1023

Update the to-be-fitted texture data based on the rendering loss function until an iteration end condition is satisfied, and take the to-be-fitted texture data updated at an end of an iteration as the fitted texture data — 1024

Bake the fitted texture data into a texture image to obtain a rendered texture image — 103

Perform, based on the rendered texture image, image rendering processing corresponding to the to-be-rendered virtual object to obtain a rendered virtual object — 104

FIG. 3B

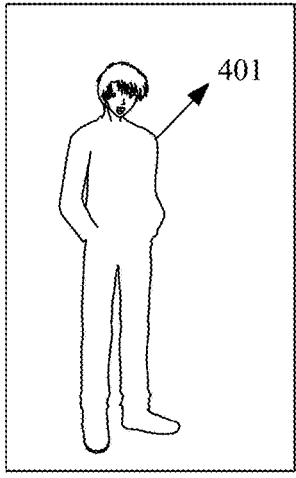

IMAGE RENDERING

CROSS-REFERENCE TO RELATED APPLICATIONS

This application claims priority to and is a continuation application of PCT/CN2022/134151, filed on Nov. 24, 2022, which claims priority to Chinese Patent Application No. 202210179700.6, filed on Feb. 25, 2022, each of which is incorporated herein by reference in its entirety.

FIELD OF THE TECHNOLOGY

This application relates to the computer graphics and image technology, and in particular to, an image rendering method and apparatus, an electronic device, a computer-readable storage medium, and a computer program product.

BACKGROUND OF THE DISCLOSURE

The display technology based on graphics processing hardware extends the perception environment and the access to information; especially with the display technology of a virtual scene, the diversified interaction between virtual objects controlled by users or artificial intelligence (AI) can be realized according to actual application requirements. With various typical application scenes, for example, in virtual scenes such as games, the true battle process between the virtual objects can be simulated.

In the related art, a physically based rendering (PBR) method loads a plurality of textures to generate the virtual objects in the virtual scene; such a solution may require a large amount of storage space and computing resources, thereby affecting user experience.

SUMMARY

The examples of this application provide an image rendering method and apparatus, an electronic device, a computer-readable storage medium, and a computer program product, which can sufficiently and effectively utilize fitted texture data and save relevant storage space and computing resources.

The technical solutions of the examples of this application are implemented as follows:

This application provides an image rendering method, comprising:

acquiring texture data of a virtual object;

performing differential fitting processing on the texture data to obtain fitted texture data;

baking the fitted texture data into a texture image to obtain a rendered texture image; and performing, based on the rendered texture image, image rendering processing corresponding to the virtual object.

The examples of this application provide an image rendering apparatus, comprising:

an acquisition module, configured to acquire texture data of a virtual object;

a fitting module, configured to perform differential fitting processing on the texture data to obtain fitted texture data;

a baking module, configured to bake the fitted texture data into a texture image to obtain a rendered texture image; and a rendering module, configured to perform, based on the rendered texture image, image rendering processing corresponding to the virtual object.

The examples of this application provide an electronic device for image rendering, the electronic device including:

a memory, configured to store computer-executable instructions; and a processor, configured to implement, when executing the computer-executable instructions stored in the memory, the image rendering method described herein.

The examples of this application provide a non-transitory computer-readable storage medium storing computer-executable instructions for causing a processor when executed, to implement the image rendering method described herein.

The examples of this application provide a computer program product including computer programs or computer-executable instructions, the computer programs or computer-executable instructions implementing, when executed by a processor, the image rendering method described herein.

This application has at least the following beneficial effects or technical advantages:

Differential fitting processing may be performed on to-be-fitted texture data; the fitted texture data is baked into a texture image; image rendering is performed on the to-be-rendered virtual object based on the rendered texture image, to sufficiently and effectively use the fitted texture data to perform image rendering; compared with the PBR method, it saves relevant storage space and computing resources, thereby improving the rendering efficiency of the virtual object.

BRIEF DESCRIPTION OF THE DRAWINGS

FIG. 2 is a structural diagram of an electronic device for image rendering.

FIGS. 3A to 3B are flow diagrams of an image rendering method.

FIG. 4 is a diagram of a base object model.

DESCRIPTION OF EXAMPLES

Figure 1A:
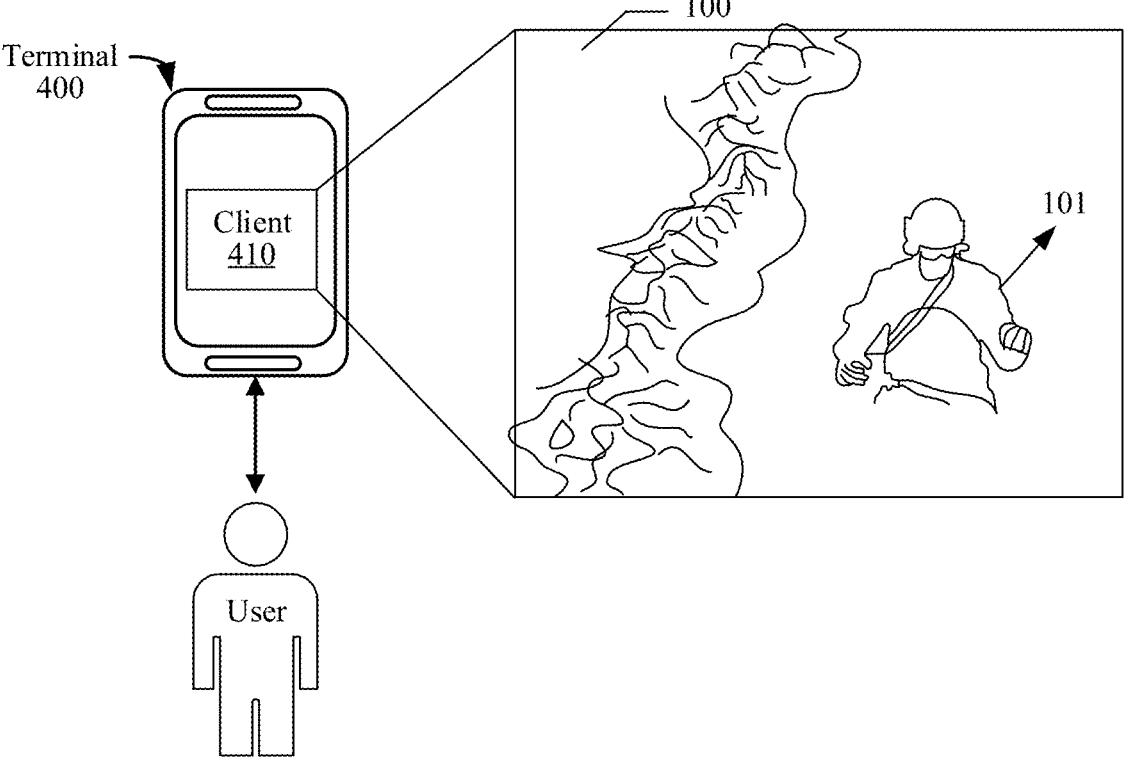
FIGS. 1A to 1B are diagrams of an application mode of an image rendering method.

To make the objectives, technical solutions, and advantages of this application clearer, the following describes this application in further detail with reference to the accompanying drawings. The described examples are not to be considered as a limitation to this application. All other examples obtained by a person of ordinary skill in the art without creative efforts shall fall within the protection scope of this application.

In the following description, the terms "first/second" are merely intended to distinguish similar objects and do not represent a particular ordering of objects. It may be understood that the terms "first/second" may be interchanged either in a particular order or in a sequential order, as permitted, to enable the examples of this application described herein to be implemented other than that illustrated or described herein.

Unless otherwise defined, meanings of all technical and scientific terms used in this specification are the same as those usually understood by a person skilled in the art to which this application belongs. The terms used herein are for the purpose of describing the examples of this application only and are not intended to limit this application.

Before the examples of this application are further described in detail, a description is made on nouns and terms in this application, and the nouns and terms are based on the following explanations:

(1) "In response to" may be used for representing a condition or state upon which the performed operation depends. The performed operation or operations may be in real-time or may have a set delay in response to meeting the dependent condition or state. Without being specifically stated, there is no limitation in the order of execution of the operations performed.

(2) A "client" may be an application (APP) running in a terminal for providing various services, such as a video playback client and a game client.

(3) A "virtual scene" may be a virtual game scene that is displayed (or provided) while a game APP is running on a terminal. The virtual scene may be a real-world simulation environment, a semi-simulation semi-fictional virtual environment, or a purely fictional virtual environment. The virtual scene may be any one of a two-dimensional (2D) virtual scene, a 2.5-dimensional (2.5D) virtual scene, or a three-dimensional (3D) virtual scene; and the dimensions of the virtual scene are not limited in this application. For example, the virtual scene may include a sky, a land, a sea, and the like. The land may include an environmental element such as a desert, a city, and the like. A user may control a virtual object to move in the virtual scene.

(4) A "virtual object" may be an image of various people and things that can interact in a virtual scene or a movable object in a virtual scene. The movable object may be a virtual character, a virtual animal, an animated character, and the like, such as a character and an animal displayed in the virtual scene. The virtual object may be a virtual avatar in the virtual scene for representing a user. A plurality of virtual objects may be included in the virtual scene, each virtual object having its own shape and volume in the virtual scene and occupying a part of the space in the virtual scene.

(5) "Scene data" may represent feature data of a virtual scene, and for example, may be the area of a construction region in the virtual scene and the architectural style where the virtual scene is currently located. It may also include the location of the virtual building in the virtual scene, the footprint of the virtual building, and the like.

(6) "Image rendering" may be a process of converting 3D light energy transfer processing into a 2D image. Scenes and objects are represented in a 3D form, closer to the real world, for ease of manipulation and transformation, while image display devices are mostly 2D raster displays and dot-matrix printers. The representation of the N-dimensional raster and dot-matrix from the representation of the 3D scene is image rendering, that is, rasterization. A raster display can be viewed as a matrix of pixels, and any image displayed on a raster display is a collection of pixels having one or more colors and greyscales.

(7) "Image baking" may be used to save the geometric features of a 3D grid to a texture file (a bitmap file); baking an object using a lightmapping technique is a technique for enhancing the lighting effect of a scene, to make the scene look more realistic, rich, and more stereoscopic through a low performance.

(8) "Detail degree" may be used for representing the richness of the details of the virtual object; according to the position where the model of the virtual object is located at the 3D environment and the importance degree of the virtual object itself, the resource allocation (such as the number of faces and the number of shaders) for object rendering can be determined; and the more resource allocation, the greater the number of details of the virtual object will be. The greater the number of details (that is, the number of triangular meshes) of the virtual object, the finer the virtual object is.

The application provides an image rendering method and apparatus, an electronic device, a computer-readable storage medium, and a computer program product, which can sufficiently and effectively utilize fitted texture data and save relevant storage space and computing resources. In order to facilitate an easier understanding of the image rendering method, an exemplary implementation scene of the image rendering method will first be described; the virtual object in the image rendering method may be output based on the terminal, or output based on the terminal and the server in cooperation.

In some examples, a virtual scene may be an environment for a game character to interact with, for example, for a game character to perform a rival battle in the virtual scene; and two-sided interaction may be performed in the virtual scene by controlling the action of the game character, thereby enabling a user to relax the stress of life during the game.

In one implementation scene, referring to FIG. 1A, FIG. 1A is a diagram of an application mode of an image rendering method. The method may be applicable to some application modes completely relying on the graphics processing hardware computing capability of a terminal 400 to complete the relevant data calculation of a virtual scene 100, such as a game in a stand-alone/off-line mode, completing the output of a virtual scene through various types of terminals 400, such as a smartphone, a tablet, and a virtual reality/augmented reality device. As an example, types of graphics processing hardware include a central processing unit (CPU) and GPU.

When forming the visual perception of the virtual scene 100, the terminal 400 may calculate data required for display via the graphics computing hardware, complete the loading, parsing, and rendering of the display data, and output a video frame capable of forming the visual perception of the virtual scene on the graphics output hardware, for example, a video frame for presenting 2D on a display screen of a smartphone, or a video frame for realizing a 3D display effect by projecting on a lens of augmented reality/virtual reality glasses. Furthermore, in order to enrich the perception effect, the terminal 400 may also form one or more auditory perceptions, tactile perceptions, motion perceptions, and taste perceptions through different hardware.

As an example, a client 410 (for example, a stand-alone version of a game application) runs on the terminal 400, and outputs a virtual scene including role-playing during the running process of the client 410; the virtual scene may be an environment for a game character to interact with, for example, may be a plain, a street, a valley, and the like for the game character to battle. Illustrated with displaying a virtual scene 100 from a first person perspective, a rendered virtual object 101 may be displayed in the virtual scene 100; the rendered virtual object 101 may be a game character controlled by a user (or referred to as a player), and may operate in the virtual scene in response to the operation of a real user on a button (including a rocker button, an attack button, a defense button, and the like); for example, when the real user moves the rocker button to the left, the virtual object will move to the left in the virtual scene, and can also remain stationary in place, jump, and use various functions (such as skills and props). The rendered virtual object 101 may also be AI set in a virtual scene battle through training. The rendered virtual object 101 may also be a non-player character (NPC) set in virtual scene interaction. The rendered virtual object 101 may also be an immovable object or a movable object in the virtual scene 100.

For example, illustrated by displaying a virtual scene 100 from a first person perspective, a to-be-rendered virtual object is displayed in the virtual scene 100; to-be-fitted texture data of the to-be-rendered virtual object is acquired by the image rendering method described herein; differential fitting processing may be performed on the to-be-fitted texture data to obtain fitted texture data; the fitted texture data may be baked into a texture image to obtain a rendered texture image; image rendering processing corresponding to the to-be-rendered virtual object is performed based on the rendered texture image to obtain a rendered virtual object 101; and human-computer interaction of the virtual scene may be performed based on the rendered virtual object 101, such as game confrontation.

Figure 1B:
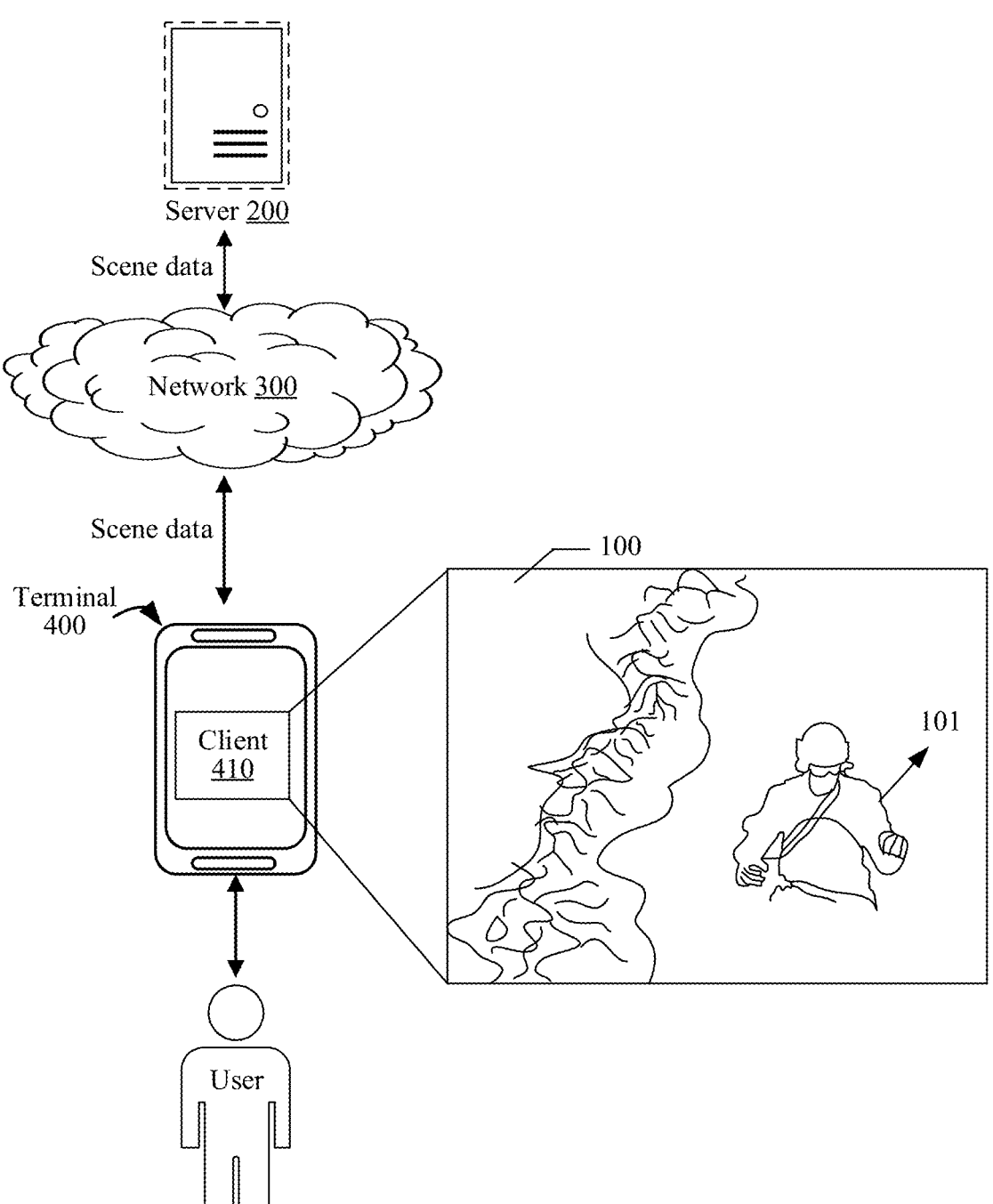

In another implementation scenario, referring to FIG. 1B, FIG. 1B is a diagram of an application mode of an image rendering method, which is applied to a terminal 400 and a server 200. The method may be applicable to an application mode that completes the calculation of a virtual scene relying on the computing capability of the server 200 and outputs the virtual scene at the terminal 400.

Taking the visual perception of forming a virtual scene 100 as an example, the server 200 may calculate display data (such as scene data) related to the virtual scene and send same to the terminal 400 via a network 300; the terminal 400 may complete the loading, parsing, and rendering of the calculated display data relying on graphic calculation hardware, and output the virtual scene relying on graphic output hardware to form the visual perception, for example, a video frame for presenting two-dimension on a display screen of a smartphone, or a video frame for realizing a three-dimensional display effect by projecting on a lens of augmented reality/virtual reality glasses. For the perception in the form of a virtual scene, it will be appreciated that it is possible to form an auditory perception through corresponding hardware outputs of the terminal 400, for example using a microphone output, and form a tactile perception using a vibrator output, and the like.

As an example, a client 410 (for example, a network version of a game application) runs on a terminal 400, and performs game interaction with other users by connecting to a server 200 (for example, a game server); the terminal 400 outputs a virtual scene 100 of the client 410. Illustrated with displaying a virtual scene 100 from a first person perspective, a rendered virtual object 101 is displayed in the virtual scene 100; the rendered virtual object 101 may be a game character controlled by a user (or referred to as a player), and may operate in the virtual scene in response to the operation of a real user on a button (including a rocker button, an attack button, a defense button, and the like); for example, when the real user moves the rocker button to the left, the virtual object will move to the left in the virtual scene, and can also remain stationary in place, jump, and use various functions (such as skills and props). The rendered virtual object 101 may also be AI set in a virtual scene battle through training. The rendered virtual object 101 may also be an NPC set in virtual scene interaction. The rendered virtual object 101 may also be an immovable object or a movable object in the virtual scene 100.

For example, illustrated by displaying a virtual scene 100 from a first person perspective, a to-be-rendered virtual object is displayed in the virtual scene 100; to-be-fitted texture data of the to-be-rendered virtual object is acquired by the image rendering method described herein; differential fitting processing may be performed on the to-be-fitted texture data to obtain fitted texture data; the fitted texture data may be baked into a texture image to obtain a rendered texture image; image rendering processing corresponding to the to-be-rendered virtual object may be performed based on the rendered texture image to obtain a rendered virtual object 101; and human-computer interaction of the virtual scene may be performed based on the rendered virtual object 101, such as game confrontation.

In some examples, the terminal 400 may implement the image rendering method by running a computer program, for example, the computer program may be a native program or a software module in an operating system. It may be a local APP, namely, a program that needs to be installed in the operating system to run, such as a dress-up game APP (namely, the above client 410). It may be an applet, namely, a program that only needs to be downloaded to the browser environment to run. It may also be a game applet that can be embedded in any APP. In general, the above computer programs may be any form of APP, module, or plug-in.

Illustrated with the computer program as an APP, in actual implementation, the terminal 400 installs and runs an APP supporting a virtual scene. The APP may be any one of a first-person shooting (FPS) game, a third-person shooting (TPS) game, a virtual reality APP, a 3D map program, or a multi-player gunfight survival game. A user uses the terminal 400 to operate a virtual object located in a virtual scene to perform an activity, and the activity includes but is not limited to at least one of adjusting body postures, crawling, walking, running, riding, jumping, driving, picking up, shooting, attacking, throwing, and constructing a virtual building. Illustratively, the virtual object may be a virtual character, such as a simulation character or an anime character.

The examples of this application may be implemented through cloud technology, which refers to a hosting technology for unifying a series of resources, such as hardware, software, and a network, in a wide area network or a local area network to realize the calculation, storage, processing, and sharing of data.

Cloud technology is a general term for network technology, information technology, integration technology, management platform technology, and application technology based on cloud computing business model application, which can form a resource pool, be used as needed, and be flexible and convenient. Cloud computing can be an important support. Background services of technical network systems require a large amount of computing and storage resources.

Exemplarily, a server 200 in FIG. 1B may be an independent physical server, and may also be a server cluster or distributed system composed of a plurality of physical servers, and may further be a cloud server providing basic cloud computing services such as cloud services, cloud databases, cloud computing, cloud functions, cloud storage, network services, cloud communications, middleware services, domain name services, security services, content delivery network (CDN), as well as big data and artificial intelligence platforms. The terminal 400 may be but is not limited to, a smartphone, a tablet, a laptop, a desktop computer, a smart speaker, and a smartwatch. The terminal 400 and the server 200 may be directly or indirectly connected through wired or wireless communication, which is not limited in the examples of this application.

Referring to FIG. 2, FIG. 2 is a structural diagram of an electronic device (e.g., the terminal 400) for image rendering. The terminal 400 shown in FIG. 2 comprises at least one processor 420, a memory 460, at least one network interface 430, and a user interface 440. The various assemblies in the terminal 400 are coupled together by a bus system 450. It may be understood that the bus system 450 may be configured to implement connection and communication between the components. The bus system 450 comprises a power bus, a control bus, and a status signal bus in addition to a data bus. However, for the sake of clarity, the various buses are labeled as bus system 450 in FIG. 2.

The processor 420 may be an integrated circuit chip with signal processing capabilities, such as a general-purpose processor, a digital signal processor (DSP), or other programmable logic devices, discrete gate or transistor logic devices, and discrete hardware assemblies; the general-purpose processor may be a microprocessor or any conventional processor, and the like.

The user interface 440 comprises one or more output apparatuses 441 enabling the presentation of media content, including one or more speakers and/or one or more visual display screens. The user interface 440 further comprises one or more input apparatuses 442, including user interface components that facilitate user input, such as a keyboard, mouse, microphone, touch-screen display screen, camera, other input buttons, and controls.

The memory 460 may be removable, non-removable, or a combination thereof. Exemplary hardware devices comprise solid-state memories, hard disk drives, optical disk drives, and the like. The memory 460 may comprise one or more storage devices physically located remotely from the processor 420.

The memory 460 comprises a volatile memory and/or a non-volatile memory and may include both volatile and non-volatile memories. The non-volatile memory may be a read-only memory (ROM), and the volatile memory may be a random-access memory (RAM). The memory 460 described herein is intended to include any suitable type of memory.

In some examples, the memory 460 can store data to support various operations, and the examples of the data include programs, modules, and data structures, or subsets or superset thereof, as exemplified below.

An operating system 461 is configured to implement various basic services and processing hardware-based tasks, including system programs for processing various basic system services, and executing hardware-related tasks, such as a framework layer, a core library layer, and a driver layer.

A network communication module 462 is configured to reach other electronic devices via one or more (wired or wireless) network interfaces 430; an exemplary network interface 430 includes Bluetooth, WiFi, a universal serial bus (USB), and the like.

A presentation module 463 is configured to enable the presentation of information (for example, a user interface for operating peripheral devices and displaying content and information) via one or more output apparatuses 441 (for example, a display screen and a speaker) associated with the user interface 440.

An input processing module 464 is configured to detect one or more user inputs or interactions from one of the one or more input apparatuses 442 and interpret the detected inputs or interactions.

In some examples, an image rendering apparatus may be implemented in software. FIG. 2 shows an image rendering apparatus 465 stored in the memory 460, which may be software in the form of a program and a plug-in, and the like, including the following software modules: an acquisition module 4651, a first mapping module 4652, a second mapping module 4653, a rendering module 4654, and a processing module 4655; these modules are logical, and therefore any combination or further division can be performed according to the functions realized.

In other examples, the image rendering apparatus may be implemented in hardware. As an example, the image rendering apparatus provided by the examples of this application may be a processor in the form of a hardware decoding processor which is programmed to execute the image rendering method provided by the examples of this application. For example, the processor in the form of the hardware decoding processor may use one or more application specific integrated circuits (ASIC), DSP, programmable logic device (PLD), complex programmable logic device (CPLD), field-programmable gate array (FPGA), or other electronic elements.

The image rendering method will be further explained in detail below in combination with the drawings. The image rendering method can be executed by the terminal 400 in FIG. 1A alone, or by the terminal 400 in cooperation with the server 200 in FIG. 1B.

Illustrated in the following is that the image rendering method is executed (e.g., performed) by the terminal 400 in FIG. 1A. Referring to FIG. 3A, FIG. 3A is a flow diagram of an image rendering method.

It should be noted that the method shown in FIG. 3A may be executed by various forms of computer programs run by the terminal 400 and is not limited to the above client 410; it may be the operating system 461, software modules, and scripts described above. Therefore, the client is not to be considered a limitation on this application.

Step 101: Acquire to-be-fitted texture data of a to-be-rendered virtual object.

It should be noted that the to-be-rendered virtual object may be a base object model; the base object model may comprise a trunk of the virtual object and may not include display information for decorating the virtual object; for example, the display information includes make-up for decorating the face of the virtual object (such as a lip, an eye shadow, a pupil, an iris, and a blush), and clothing for decorating the limbs of the virtual object (such as antique and combat clothing); and for example, the to-be-rendered virtual object 401 shown in FIG. 4 is a base object model, and decoration needs to be added to the base object model, such as make-up and clothing.

It should be noted that the to-be-fitted texture data may be parameters in the initialized texture image, including material parameters, texture parameters, and the like.

Step 102: Performing differential fitting processing on the to-be-fitted texture data to obtain fitted texture data.

For example, large rendering overhead (e.g., large inclusion footprint, memory footprint, bandwidth footprint, and more computational cost) may be incurred due to the rendering methods in the related art (for example, the PBR technology). Therefore, this application might not load various textures to perform image rendering via the PBR technology to generate a virtual object in a virtual scene in real-time, but may perform differential fitting processing on to-be-fitted texture data based on the rendered result of PBR (a detailed process of differential fitting processing is described subsequently) to obtain the fitted texture data, and perform real-time rendering based on the fitted texture data, avoiding loading various textures, saving relevant storage space and computing resources, and thereby improving the rendering efficiency of the virtual object.

It should be noted that before performing the differential fitting, the rendering scene may be initialized, including loading a model (base object model), texture, material, and the like, followed by setting the position and orientation of the camera, setting the position and orientation of the model, and setting the parameters of various lights. In the process of performing differential fitting, the to-be-fitted texture data may be continuously optimized, so that the fitted rendering graph obtained by performing fitting processing on the to-be-fitted texture data may be as similar as possible to the PBR-based target rendering graph; the target rendering graph may refer to the rendering result obtained by loading the textures through the PBR technology to perform image rendering.

Referring to FIG. 3B, FIG. 3B is an alternative flow diagram of an image rendering method provided by an embodiment of this application. FIG. 3B shows that step 102 in FIG. 3A can be implemented from step 1021 to step 1024.

Step 1021: Perform standard (e.g., first) rendering processing corresponding to the to-be-rendered virtual object to obtain a target rendering graph corresponding to the virtual object.

As an example of standard rendering processing, a to-be-rendered virtual object may be subjected to standard rendering processing by a standard rendering technology to obtain a target rendering graph. The standard rendering processing may be performed based on physical web graphics library (WebGL) technology, which provides an APP interface for drawing 3D graphics. Specifically, the above performance of standard rendering processing corresponding to a to-be-rendered virtual object to obtain a target rendering graph corresponding to the virtual object can be realized by calling an APP interface provided by WebGL to execute the following technical solutions: acquiring a plurality of rendering data of the to-be-rendered virtual object; and performing physical-based rendering processing based on the plurality of rendering data to obtain the target rendering graph corresponding to the virtual object.

For example, a plurality of rendering data (including texture data and material data) of a to-be-rendered virtual object may be loaded by the PBR technology, and the plurality of rendering data may be rendered based on the physical rule to obtain a target rendering graph complying with the physical rule. The rendering result obtained by fitting can be optimized as much as possible by the target rendering graph provided by an embodiment of this application.

Step 1022: Perform the following iterative processing: performing fitted rendering processing based on the to-be-fitted texture data to obtain a fitted rendering graph.

As an example, the orientation of the virtual object in the target rendering graph is the same as that set when fitting in the iterative processing. Taking the to-be-fitted texture data as a resource, fitted rendering processing may be performed on the to-be-fitted texture data in a rendering manner of an unlit, to obtain a fitted rendering graph.

In some examples, the performing fitted rendering processing based on the to-be-fitted texture data to obtain a fitted rendering graph in step 1022 can be achieved by the following technical solutions: determining a fitted mapping relationship between texture data and a rendering graph; mapping the to-be-fitted texture data based on the fitted mapping relationship to obtain the fitted rendering graph.

For example, the rendering process is a very complex fitted mapping relationship f; the input thereof is x; x is a parameter set, including data such as a vertex position, a material parameter, and a texture parameter; and the output y of f is a rendering result (namely, a fitted rendering graph). This application might not optimize data such as a vertex position, only the to-be-fitted texture data (including a material parameter and a texture parameter) in x needs to be optimized; after inputting the to-be-fitted texture data into a fitted mapping relationship f, the fitted mapping relationship f outputs a fitted rendering graph.

Step 1023: Construct a rendering loss function based on a difference between the target rendering graph and the fitted rendering graph.

As an example, a difference value between the pixel value of each position in the target rendering graph and the pixel value of each position in the fitted rendering graph can be obtained, and the difference value corresponding to each position is averaged to obtain the rendering loss function.

Step 1024: Update the to-be-fitted texture data based on the rendering loss function until an iteration end condition is satisfied, and take the to-be-fitted texture data updated at an end of an iteration as the fitted texture data.

The fitted rendering graph may continually optimize the to-be-fitted texture data so that the fitted rendering graph is as similar as possible to the PBR-based target rendering graph.

It should be noted that the orientation of the to-be-rendered virtual object may be set in the process of differential fitting; in actual game running, the virtual objects are not always in the same orientation, so the rendering effect of each orientation of the virtual object may need to be fitted, so that the fitting effect of each orientation of the virtual object can be ensured, and therefore all the processing involved in step 1021 to step 1024 are performed for to-be-fitted texture data corresponding to a certain orientation.

In some examples, the above constructing a rendering loss function based on a difference between the target rendering graph and the fitted rendering graph can be achieved by the following technical solutions: determining a pixel value difference between the target rendering graph and the fitted rendering graph in a screen space; and determining the rendering loss function based on the pixel value difference and a size of the target rendering graph. A loss function may be determined using the difference of pixel dimensions, so that a fitted rendering graph can be optimized from the pixel dimensions, and the fitted rendering graph approaches a target rendering graph, thereby improving the optimization effect.

For example, the pixel value difference between the target rendering graph and the fitted rendering graph in a screen space may be obtained through the following manner performing the following processing for any same pixel of the target rendering graph and the fitted rendering graph in the screen space: determining a first pixel value corresponding to the pixel in the fitted rendering graph, and determining a second pixel value corresponding to the pixel in the target rendering graph; taking an absolute value of a difference value between the first pixel value and the second pixel value as a pixel value difference of the pixel; and summing pixel value differences of a plurality of pixels in the target rendering graph as the pixel value difference between the target rendering graph and the fitted rendering graph in the screen space.

For example, the rendering loss function may be $$L1(Img1, Img2) = \frac{1}{HW}\sum\nolimits_{i=1}^{H}\sum\nolimits_{j=1}^{W}|Img1_{i,j} - Img2_{i,j}|;$$

Img1 and Img2 represent the target rendering graph and the fitted rendering graph, respectively; H and W represent the length and width of Img1 (or Img2), respectively;

$$\sum\nolimits_{i=1}^{H}\sum\nolimits_{j=1}^{W}|Img1_{i,j} - Img2_{i,j}|$$

represents the pixel value difference between the target rendering graph and the fitted rendering graph in the screen space; and (i, j) represents the target rendering graph and the fitted rendering graph at any position in the screen space.

It should be noted that the rendering loss function is not limited to $$L1(Img1, Img2) = \frac{1}{HW}\sum\nolimits_{i=1}^{H}\sum\nolimits_{j=1}^{W}|Img1_{i,j} - Img2_{i,j}|,$$

but may be other deformation formulas.

In some examples, the above updating the to-be-fitted texture data based on the rendering loss function may be achieved by the following technical solutions: performing, based on the rendering loss function, partial derivative processing on the to-be-fitted texture data to obtain a gradient of the rendering loss function; and updating the to-be-fitted texture data based on the gradient of the rendering loss function to obtain new to-be-fitted texture data.

It should be noted that a process of updating to-be-fitted texture data based on a rendering loss function is similar to a back propagation process of machine learning; the to-be-fitted texture data is input to a differentiable rasterization renderer; a fitted rendering graph is output through a forward rendering process of the differentiable rasterization renderer; since an output result of the differentiable rasterization renderer has an error with a target rendering graph, an error between the output result and the target rendering graph is calculated; reverse rendering is performed based on the error; in the process of reverse rendering, the to-be-fitted texture data is adjusted according to the error, namely, according to the error between the output result and the target rendering graph, a rendering loss function is constructed, and the partial derivative of the rendering loss function to the to-be-fitted texture data is obtained; a gradient of the rendering loss function to the to-be-fitted texture data is generated; since the direction of the gradient indicates the direction in which the error expands, a gradient descent algorithm is used to update the to-be-fitted texture data; and the above process is continuously iterated until the iteration end condition is satisfied.

In some examples, the iteration end condition comprises at least one of the following: a value of the rendering loss function being less than a loss threshold; and the number of the iteration reaching a set number.

For example, when the number of iterations is not limited, the degree of similarity of the fitted rendering graph to the PBR-based target rendering graph may be defined by setting a loss threshold; the smaller the loss threshold, the more similar the fitted rendering graph to the PBR-based target rendering graph. When the loss threshold is not defined, the degree of similarity of the fitted rendering graph to the PBR-based target rendering graph is defined by setting the number of iterations; the greater the set number of iterations, the more similar the fitted rendering graph to the PBR-based target rendering graph, but the more time-consuming the iteration process.

In some examples, a setting entry for an iteration end condition may be displayed. In response to the setting operation for the setting entry, the content input through the setting operation may be taken as the iteration end condition.

For example, the setting entry may be a text input box; a setting operation for the text input box may be achieved by inputting text in the text input box; and the input text may be taken as an iteration end condition, for example, if 100 iterations are input in the text input box, 100 may be taken as a set number of the iteration; and if 5 is input in the text input box, 5 may be taken as a set loss threshold. The setting entry may also be a scroll bar by which an iteration end condition is set. The examples of this application flexibly control the iteration process by manually setting the iteration end conditions to make the fitted rendering graph meet the user's requirements.

In some examples, historical detail degrees of a plurality of historical virtual objects in a virtual scene may be obtained, and one historical virtual object may correspond to at least one historical detail degree. A detail degree for rendering a to-be-rendered virtual object may be determined based on a plurality of historical detail degrees, types of the detail degree including at least one of the following: a highest historical detail degree; a historical detail degree with a highest application frequency; and a detail degree averaged over the plurality of historical detail degrees. The detail degree for rendering the to-be-rendered virtual object may be mapped to obtain the iteration end condition.

For example, a historically rendered virtual object can represent a user preference to a certain extent, and therefore a historical detail degree (a detail amount of the virtual object; when the more the detail amount (e.g., the number of triangular meshes) of the virtual object is, the finer the virtual object is) of the historical virtual object for a set period (for example, about one month) is acquired. The highest historical detail degree among a plurality of historical detail degrees can be taken as the detail degree for rendering the to-be-rendered virtual object; the historical detail degree with the highest application frequency among the plurality of historical detail degrees can also be taken as the detail degree for rendering the to-be-rendered virtual object. The detail degree after the plurality of historical detail degrees may be averaged may also be used as the detail degree for rendering the to-be-rendered virtual object, and the detail degree for rendering the to-be-rendered virtual object may also be synthesized by combining the highest historical detail degree, the historical detail degree with the highest application frequency, and the detail degree after the plurality of historical detail degrees may be averaged. A mapping relationship between the detail degree and the iteration end condition may be acquired; based on the mapping relationship between the detail degree and the iteration end condition, the detail degree used for rendering the to-be-rendered virtual object may be mapped to obtain an iteration end condition for fitting the rendering, for example, the detail degree being 100; and the iteration end condition may be calculated to be 50 iterations through a mapping function between the detail degree and the iteration end condition, the detail degree being proportional to the iteration end condition.

In some examples, scene data of a virtual scene may be acquired. Based on the scene data of the virtual scene and the target rendering graph, a condition prediction model may be called to perform condition prediction processing to obtain the iteration end condition; the condition prediction model may be obtained by training historical scene data, a historical target rendering graph, and/or a historical iteration end condition.

It should be noted that the condition prediction model may be obtained by training historical scene data, a historical target rendering graph and a historical iteration end condition; the condition prediction model can be various neural network models, such as a convolution neural network model, a circulation neural network model, and a depth neural network model.

As an example, historical scene data, a historical target rendering graph, and a historical iteration end condition are taken as training data, and the training process using the training data is as follows: condition prediction processing may be performed on the historical scene data, and the historical target rendering graph through the initialized condition prediction model to obtain a prediction probability of each candidate iteration end condition; a first prediction probability of the candidate iteration end condition which is the same as the historical iteration end condition may be obtained, a flag value of the historical iteration end condition being 1; a loss function may be determined based on the difference between the first prediction probability and the numerical value 1; a parameter change value of the condition prediction model when a loss function takes a minimum value is acquired; and parameters of the condition prediction model may be updated based on the parameter change value.

As an example, the condition prediction model may comprise a convolution layer, a pooling layer, and a full connection layer; the condition prediction processing may be performed on the historical scene data and the historical target rendering graph through the initialized condition prediction model to obtain a prediction probability of each candidate iteration end condition, which can be achieved by the following technical solutions: Feature extraction processing may be performed on the historical scene data and the historical target rendering graph through a convolution layer to obtain a scene feature of the historical scene data and an image feature of the historical target rendering graph; pooling processing may be performed on the scene feature and the image feature through a pooling layer to obtain a pooling feature; and mapping processing may be performed on the pooling feature through a full connection layer to obtain a prediction probability of each candidate iteration end condition.

After the training is completed, the condition prediction model may perform conditional prediction on the scene data of the virtual scene and the target rendering graph to obtain a predicted iteration end condition (e.g., the predicted number of the iteration or a predicted loss threshold); the stricter the predicted iteration end condition is, the finer the scene data in the virtual scene needs to be adapted to other virtual objects in the virtual scene; for example, the to-be-rendered virtual object may be a virtual character in a game, and other virtual objects in the game are a virtual mountain peak, a virtual green plant, and the like; when the virtual mountain peak and the virtual green plant are finer, the finer the to-be-rendered virtual object may need to be rendered, and the more stringent the predicted iteration end conditions may be.

Step 103: Bake the fitted texture data into a texture image to obtain a rendered texture image.

Specifically, in the above step 102, if updating the to-be-fitted texture data based on the rendering loss function satisfies an iteration end condition (for example, the value of the rendering loss function Loss is less than a set threshold), it may indicate that the fitted rendering graph is very close to the original PBR effect at this time, the iteration process is exited; the updated to-be-fitted texture data obtained at the end of the iteration is taken as the fitted texture data, and step 103 may be carried out to bake the fitted texture data into the texture image to obtain the rendered texture image, which may be equivalent to saving the fitted texture data into the texture image to obtain the rendered texture image. This rendered texture image can then be used for image rendering during the game.

Step 104: Perform, based on the rendered texture image, image rendering processing corresponding to the to-be-rendered virtual object to obtain a rendered virtual object.

As an example of step 103 and step 104, after the fitted texture data is baked into a texture image to obtain a rendered texture image, the rendered texture image can be used for real-time image rendering during a game, to avoid loading various textures, save relevant storage space and computing resources, and thus improve the rendering efficiency of a virtual object.

In some examples, the performing, based on the rendered texture image, image rendering processing corresponding to the to-be-rendered virtual object to obtain a rendered virtual object in step 104 can be achieved by the following technical solutions: determining 2D texture coordinates of the to-be-rendered virtual object; and performing, based on the 2D texture coordinates, sampling fitting processing on the rendered texture image to obtain the rendered virtual object.

For example, before performing differential fitting, 2D texture coordinates, for example, UV2 of a to-be-rendered virtual object may be automatically generated; a rendered texture image may be sampled through the UV2; and the fitted texture (e.g., a rendered texture image) may be pasted on the to-be-rendered virtual object to realize a real-time rendering process.

The examples of this application may be applied to rendering scenes of various games, such as confrontation games, racing games, and cross-dressing games. A virtual scene is described as an example of a game.

In recent years, with the popularity of the PBR technology in rendering, the rendering effect of mobile-end games is also gradually improved, but at the same time, PBR also brings more rendering overhead (large inclusion footprint, memory footprint, bandwidth footprint, and more computational cost).

Figure 5:
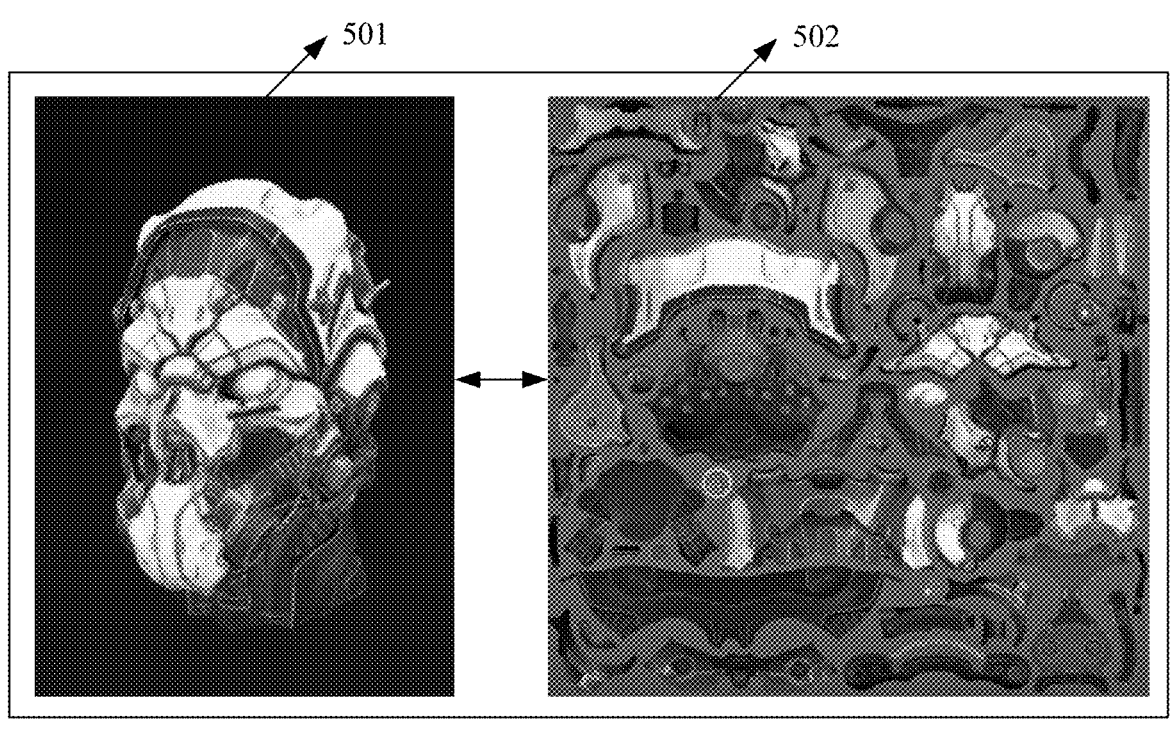
FIG. 5 is a rendering diagram.

As shown in FIG. 5, the substance painter baked lighting method provides a solution for baking the PBR rendering effect in a certain direction to the texture, storing the current rendering result 501 in the unwrapped texture coordinate

15

(UV) space 502 by fixing the light source, the model position, and orientation after adjusting the texture and lighting.

However, the related art needs to manually and repeatedly adjust the lighting parameters and the orientation position of the model to perform baking to achieve a desired result, and can only bake the rendering result in one direction, and cannot guarantee that the rendering effect in other directions is correct, such as the back surface, and can only store a low dynamic range texture (LDRT), but cannot store a high dynamic range texture (HDRT), and can lose important high dynamic range (HDR) information, and lose the rendering effect.

In order to solve the above problems, this application provides a computing framework based on differentiable rendering (DR) and a machine learning fitting algorithm (realized by the image rendering method described herein), which bake a PBR-based target rendering graph to a texture, can greatly reduce the rendering overhead of the PBR, and align the original PBR rendering effect as far as possible, so that the PBR effect can be obtained with a lower overhead during the game.

It should be noted that the examples of this application are applicable to most mobile game projects, and particularly, can satisfy mobile game projects requiring higher rendering performance and rendering effect, and the solution can greatly improve the rendering efficiency and achieve a small difference from the original effect.

Figure 6:
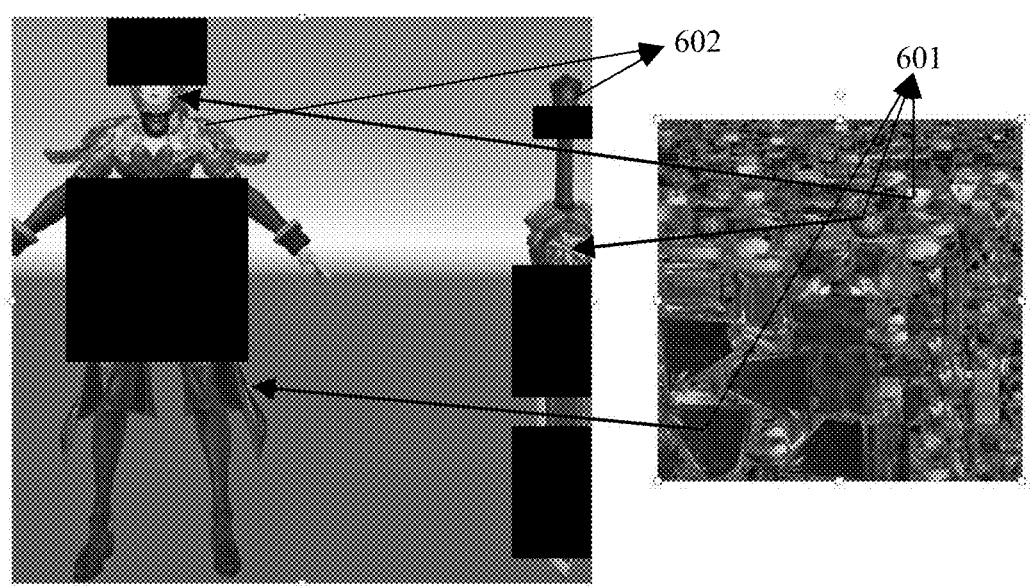
FIG. 6 is a rendering schematic.

It should be noted that as shown in FIG. 6, the rendering effect in the game of the embodiment of this application only requires one piece of texture and corresponding UV2 vertex data, and can be seen as pasting the fitted texture 601 on a model 602 (namely, a to-be-rendered virtual object) using the second texture coordinate (UV2).

Figure 7:
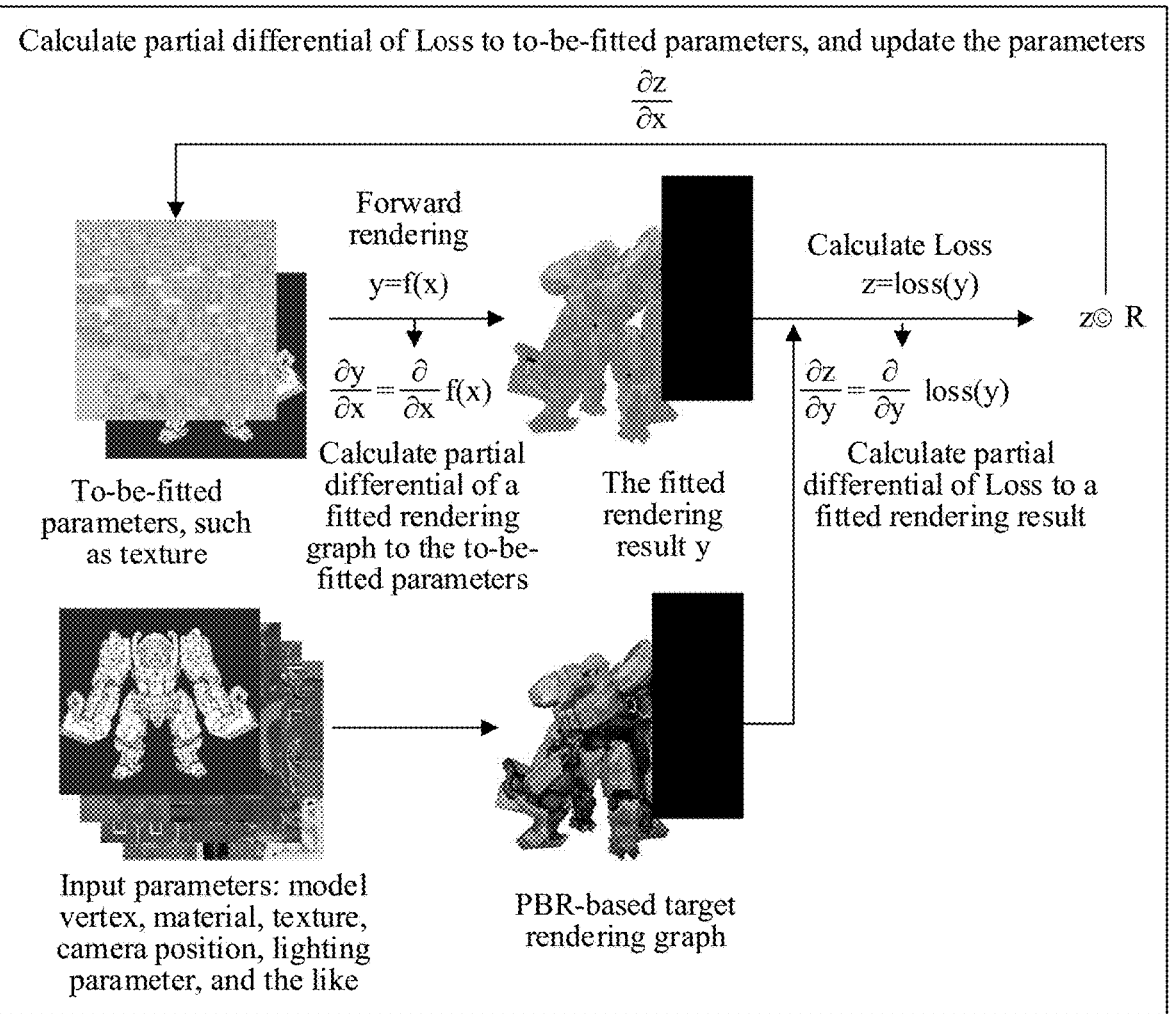
FIG. 7 is a diagram of a fitted rendering flow.

The computing framework based on DR and a machine learning fitting algorithm provided by examples of this application are described in detail below:

As shown in FIG. 7, the rendering process is a very complex function f whose input is x; x is a parameter set containing data such as model vertex positions, material parameters, and texture parameters; and the output y of f is a fitted rendering graph.

This application may not optimize data such as a vertex position. Only to-be-fitted texture data (including a material parameter and a texture parameter) in x may need to be optimized; and the object may be to calculate x so that f (x) approaches to the PBR-based target rendering graph as far as possible given the PBR-based target rendering graph, and the degree of approximation may be calculated using a loss function. The partial differential of the fitted rendering graph to the to-be-fitted parameters may be calculated by the following formula $$\frac{\partial y}{\partial x} = \frac{\partial}{\partial x} f(x),$$

the partial differential of the loss function to the fitted rendering graph may be calculated by the following formula $$\frac{\partial z}{\partial y} = \frac{\partial}{\partial y} \text{Loss}(y),$$

16 and the partial differential of the loss function to the to-be-fitted parameters may be calculated by the following formula $$\frac{\partial z}{\partial x}.$$

The gradient descent algorithm may be adopted in the optimization algorithm. However, f is a very complex function and the normal rendering flow is not derivable, so in order to use a gradient descent algorithm to find the optimal x requires that f be derivable, the examples of this application provide a derivable (e.g., differentiable) rasterization rendering framework.

Figure 8:
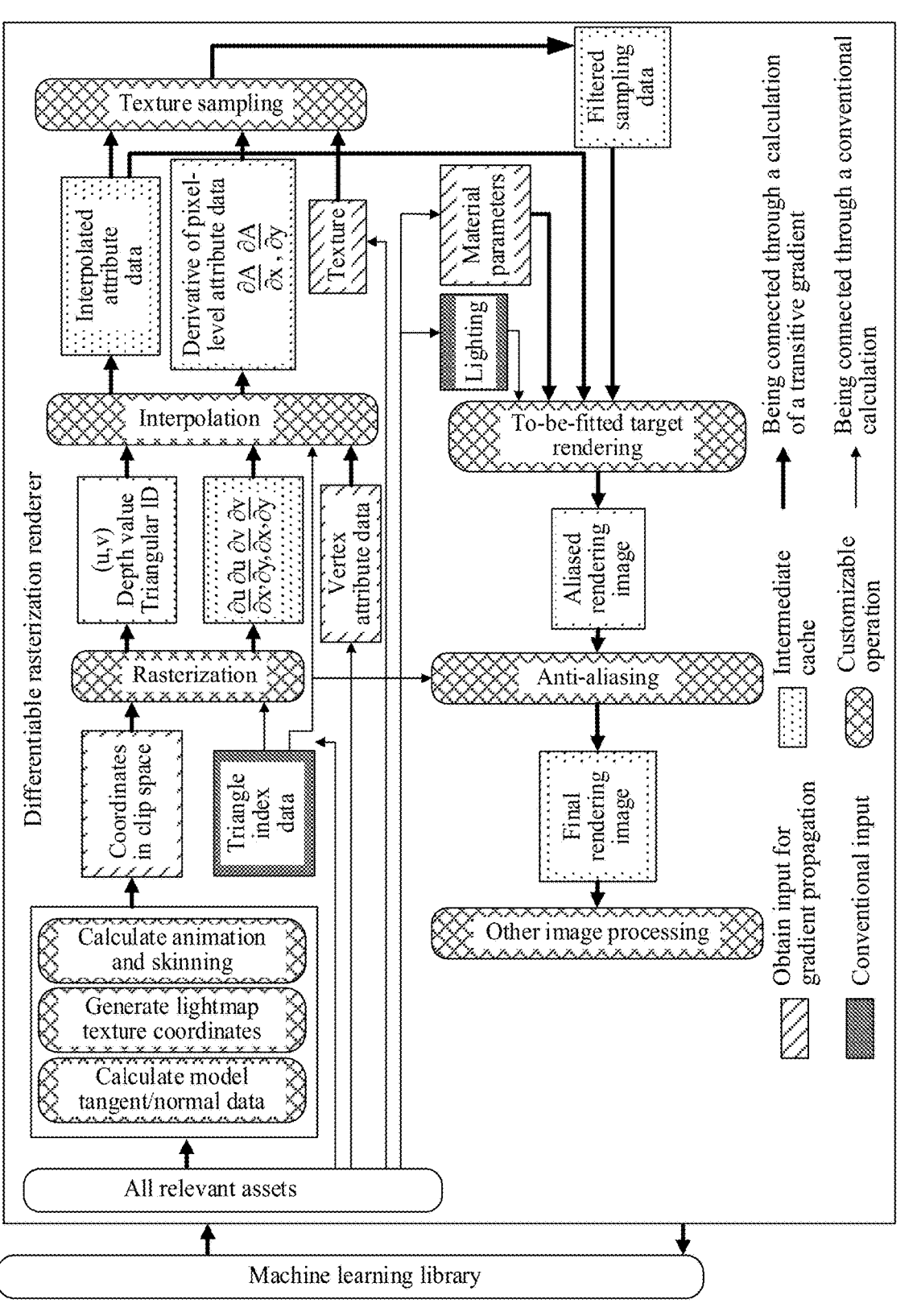
FIG. 8 is a diagram of a rasterization rendering flow.

It should be noted that f is a complete rasterization rendering flow, and in order to make it differentiable, this application improves the rasterization rendering. As shown in FIG. 8, the reformed whole rasterization rendering flow is realized by a compute unified device architecture (CUDA) and runs as a module of a machine learning library (such as PyTorch), and the whole rendering process can inversely propagate gradients, so the whole process is differentiable.

As shown in FIG. 8, all relevant assets may be connected through a calculation of a transitive gradient; model tangent/normal data may be acquired; lightmap texture coordinates may be generated; animation and skinning may be calculated; model tangent/normal data, lightmap texture coordinates, and the animation and skinning may be connected through a calculation of a transitive gradient; coordinates in a clip space may be acquired; all relevant assets may be connected through a conventional calculation; triangle index data may be acquired; and rasterization may be performed based on the coordinates in the clip space and the triangle index data to obtain coordinates (u,v), $$\frac{\partial u}{\partial x}, \frac{\partial u}{\partial y}, \frac{\partial v}{\partial x}, \text{ and } \frac{\partial v}{\partial y};$$

interpolation processing may be performed based on the coordinates (u,v), $$\frac{\partial u}{\partial x}, \frac{\partial u}{\partial y}, \frac{\partial v}{\partial x}, \frac{\partial v}{\partial y},$$

and vertex attribute data to obtain interpolated attribute data and a derivative of pixel-level attribute data; based on the interpolated attribute data, a derivative of pixel-level attribute data, and a texture, texture sampling processing may be performed to obtain filtered sampling data; to-be-fitted target rendering may be performed based on lighting, material parameters, interpolated attribute data, and filtered sampling data to obtain a aliased rendering image; and anti-aliasing processing may be performed on the aliased rendering image to obtain a final rendering image.

Figure 9:
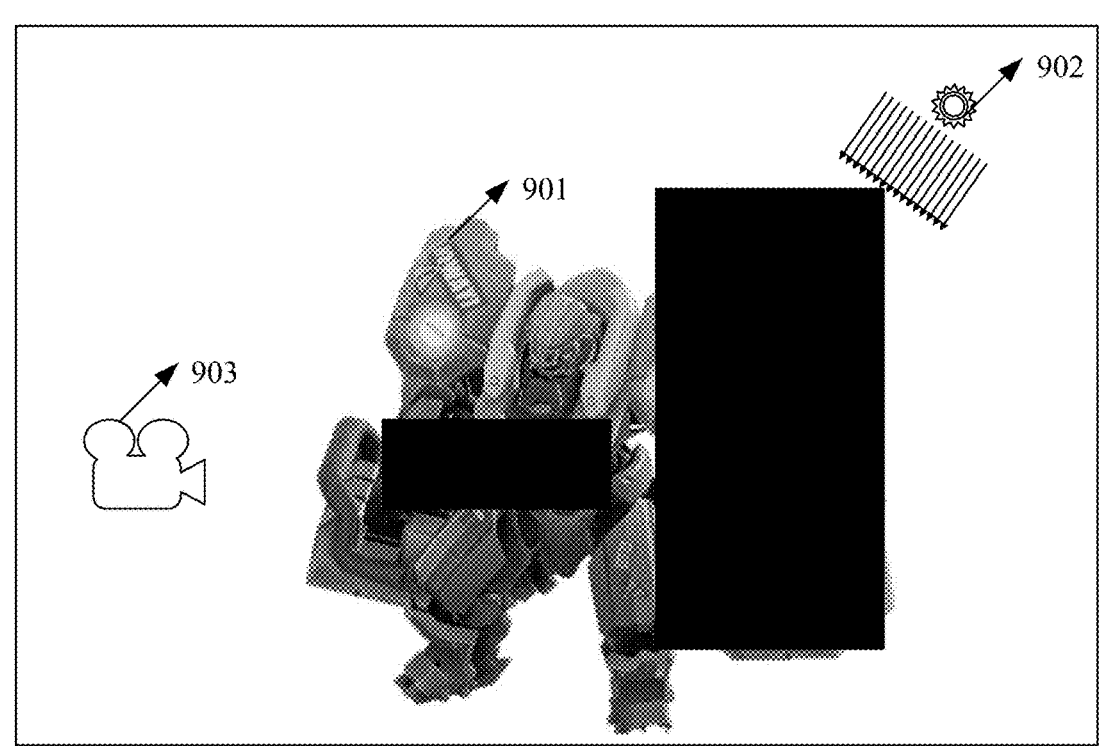
FIG. 9 is a diagram of a machine learning fitted scene.

The machine learning fitting process will be further described in detail below, and the input and output of the fitting process may be as follows:

As shown in FIG. 9, the input part may comprise: (1) an original virtual character rendered by PBR, including a model 901, a material sphere, and lighting 902 (which may include a parallel light, a point light, a surface light source, and the like); (2) a camera 903, which may remain stationary throughout the fitting process.

Figure 10:
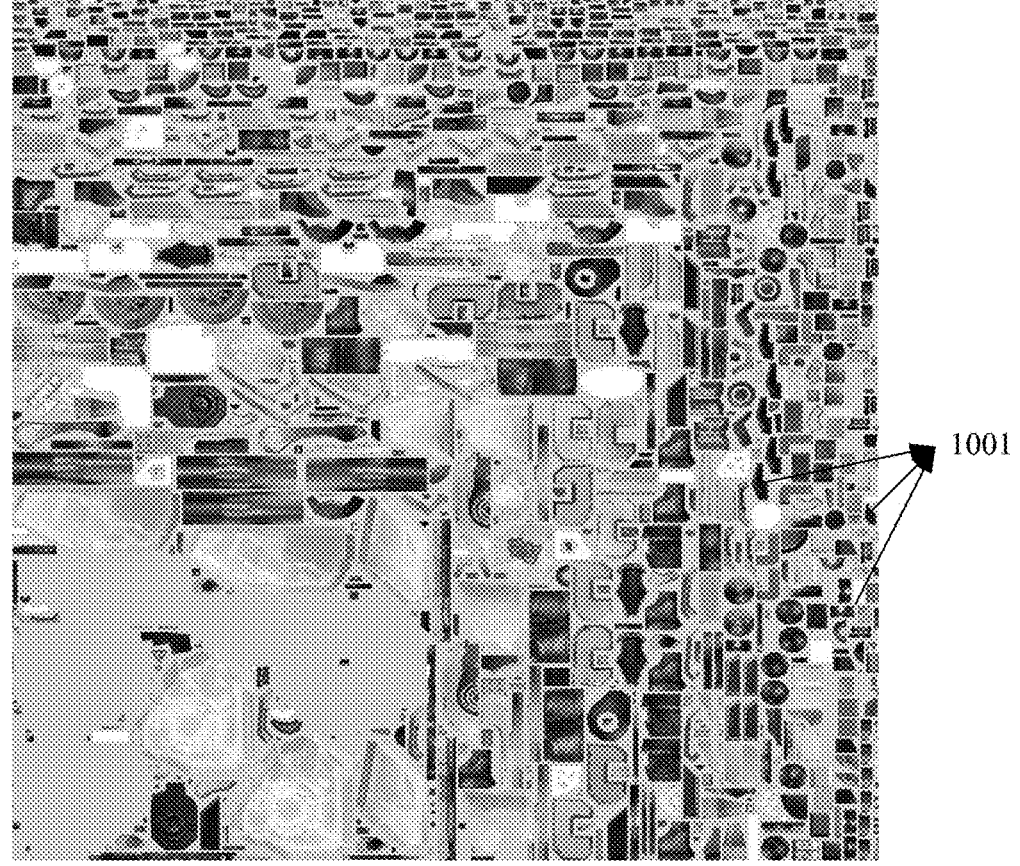
FIG. 10 is a diagram of a fitted texture.

The output part may comprise (1) an automatically generated model UV2 for mapping the rendering result of the model to a texture space; (2) a texture 1001 unwrapped based on the UV2, as shown in FIG. 10, which is stored as a baked rendering result when the fitting is finished. The pixel parameters of this texture are denoted by φ in the following description.

Figure 11:
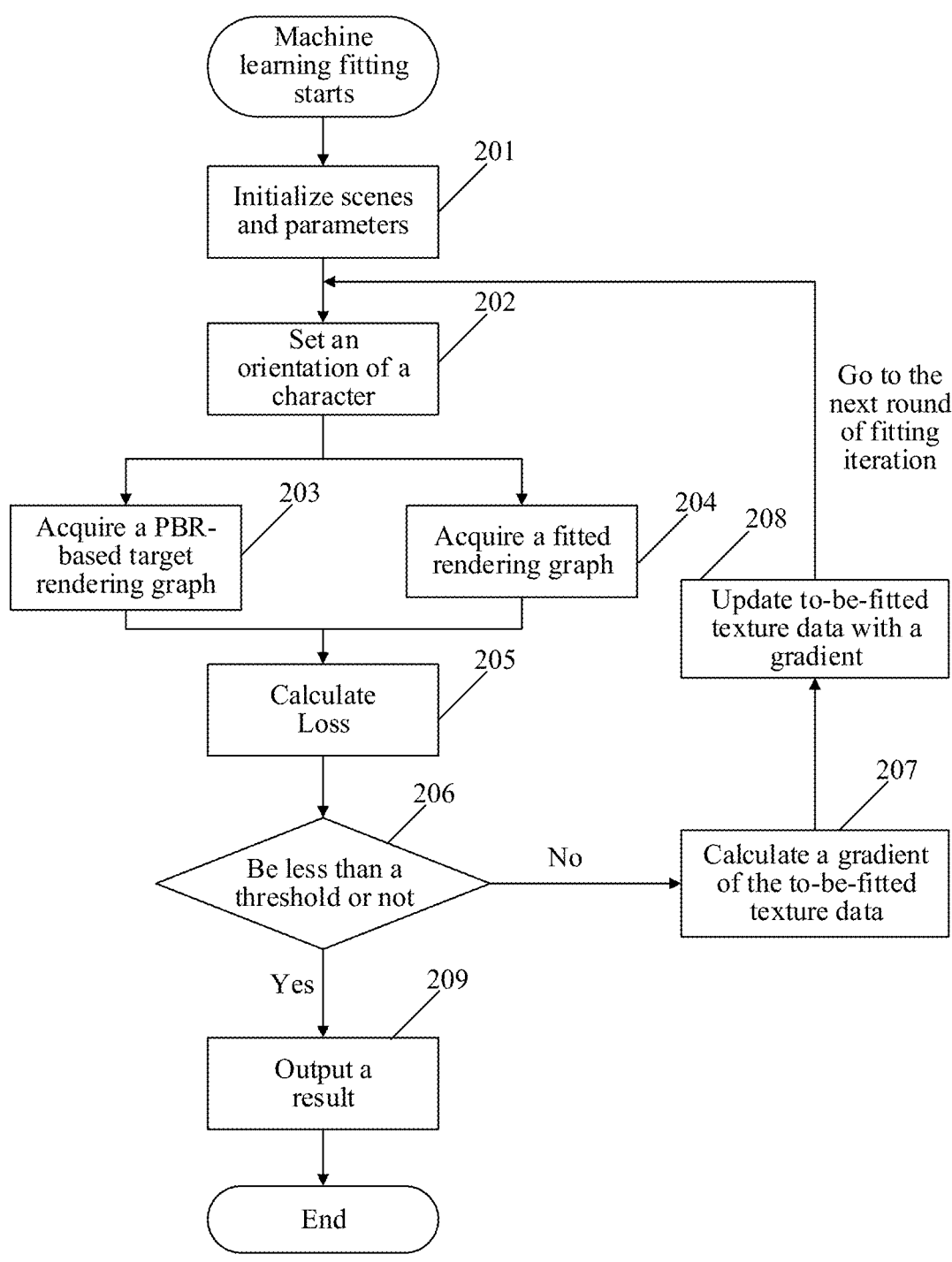
FIG. 11 is a flow diagram of a machine learning fit.

As shown in the complete fitting process in FIG. 11, under the given input and output conditions, the complete fitting process may comprise 7 steps, and each step will be described in detail as follows:

Step 201: Initialize scenes and parameters.

Figure 12:
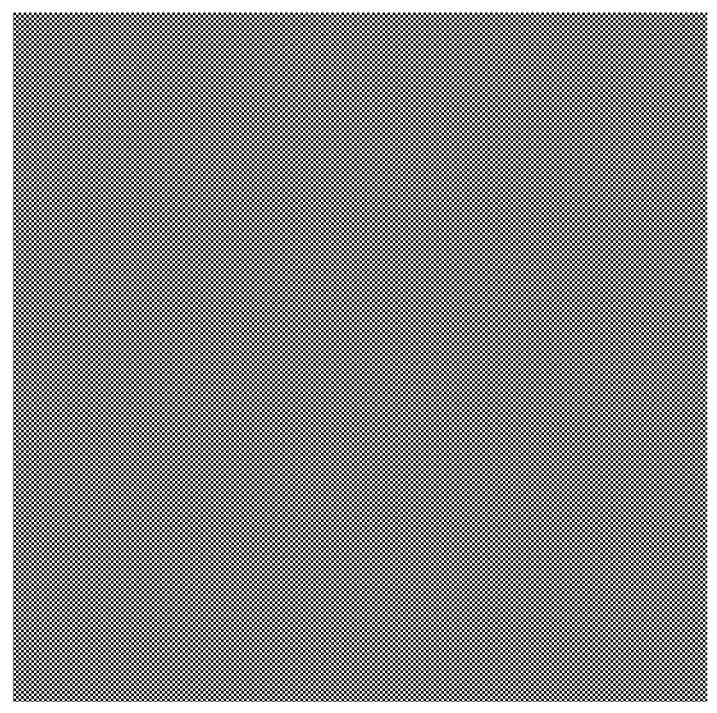
FIG. 12 is a diagram of an initial value of a to-be-fitted texture.

Prior to performing the machine learning fitting, the scene may be initialized, including loading models, textures, materials, and the like; then the camera's position and orientation (may not be optimized), the model's position and orientation, the parameters of the various lights (may not be optimized), and the automatically generated model UV2 may be set. There may be also a need to initialize to-be-fitted texture data; the to-be-fitted texture data may comprise data for each pixel, which may typically be initialized to a gray constant as shown in FIG. 12. The parameters of camera position, orientation, and lighting may not be optimized in the process of machine learning fitting.

Step 202: Set the orientation of the character, and particularly, set the orientation of the virtual character (that is, the model) during the machine learning fitting.

Figure 13:
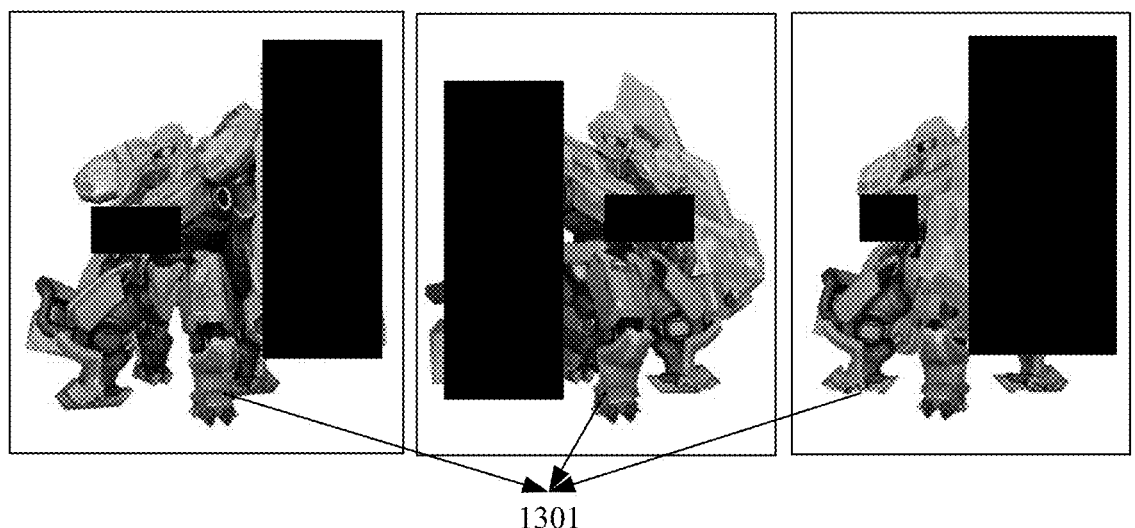
FIG. 13 is a screen space rendering graph of a virtual character.

In the actual game running, the virtual characters may not always be in the same orientation, so it may be necessary to fit the rendering effect of each orientation of the characters, to ensure that the fitting effect of each state of the virtual characters is relatively accurate. As shown in the orientation setting example of the virtual character in FIG. 13, three different orientations of the virtual character 1301 randomly set the orientation of one virtual character at each iteration.

Step 203: Acquire a PBR-based target rendering graph.

Figure 14:
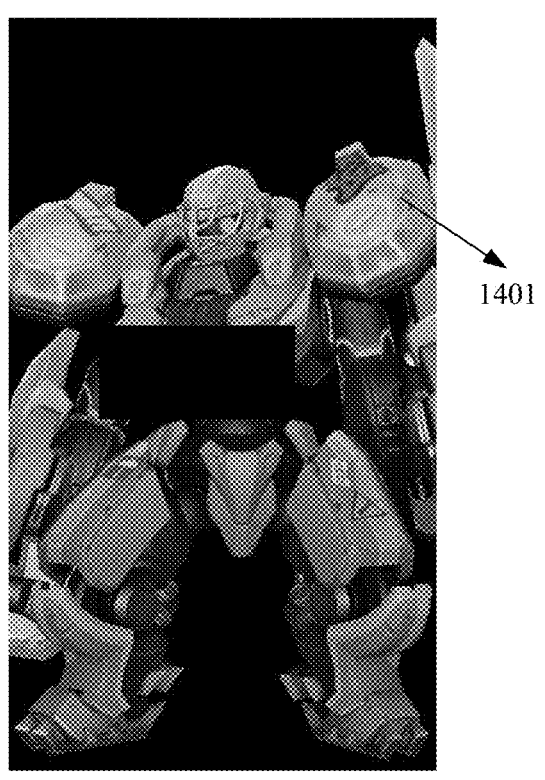
FIG. 14 is a screen space rendering graph of a virtual character.

Specifically, PBR rendering processing may be performed according to the set orientation; what the PBR rendering processing achieves may be a target rendering effect needing to be fitted, and PBR rendering may need to be performed first using resources of an original PBR to obtain a rendering graph (namely, a target rendering graph) of a certain orientation of a virtual character 1401 as shown in FIG. 14.

Step 204: Acquire a fitted rendering graph.

Figure 15:
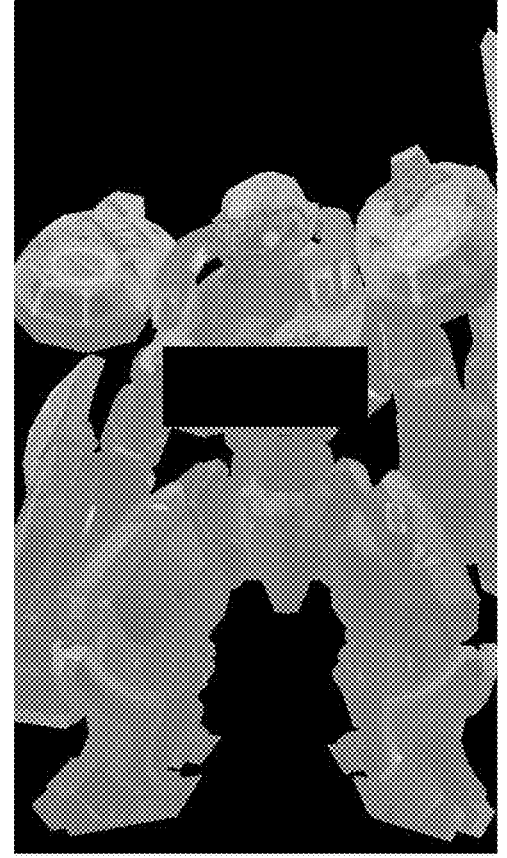
FIG. 15 is a screen space rendering graph of a fitted virtual character.

Specifically, the same orientation of the virtual character may be adopted; the to-be-fitted texture data may be used as a resource; and the rendering is performed in an unlit rendering manner, to obtain a rendering graph with the same orientation as shown in FIG. 15 (e.g., a fitted rendering graph).

Step 205: Calculate Loss.

Figure 16:
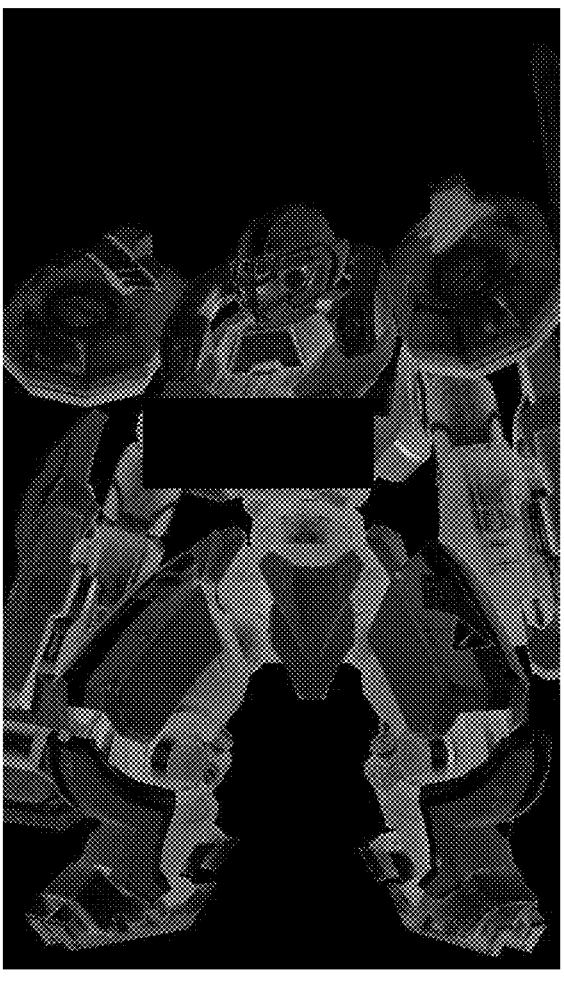
FIG. 16 is a diagram of a pixel value difference between a PBR-based target rendering graph and a fitted rendering graph in a screen space.

In order to enable the fitted rendering to approach the original PBR rendering, it may be necessary to modify the to-be-fitted texture data firstly, a gap between a PBR-based target rendering graph and the fitted rendering graph may be calculated; and FIG. 16 is a pixel value difference of the two in a screen space, and the embodiment of this application uses an L1 Loss function, as shown in formula (1):

$$L1(Img1, Img2) = \frac{1}{HW} \sum_{i=1}^{H} \sum_{j=1}^{W} |Img1_{i,j} - Img2_{i,j}| \qquad (1)$$

Img1 and Img2 represent a PBR-based target rendering graph and a fitted rendering graph, respectively, namely, FIG. 14 and FIG. 15; H and W represent the length and width of Img1 (or Img2), respectively.

Step 206: Determine whether Loss is less than a threshold or not; if so, proceed to step 207 and step 208; and if not, proceed to step 209.

Step 207: Calculate a gradient of the to-be-fitted texture data.

After computing Loss, the gradient of Loss to φ can be computed through the PyTorch framework and the differentiable rasterization renderer.

Step 208: Update the to-be-fitted texture data with the gradient.

After calculating the gradient data of φ, the optimizer of PyTorch is used to update φ before going to step 202 to enter the next iteration, continuously repeating the iterative process of the previous step 2 to step 7, the data of φ may gradually converge and approach the optimal value.

Step 209: Output the result.

When the value of Loss is small (less than the set threshold), the fitted rendering graph has been very close to the original PBR effect, namely, the whole iteration process may be exited, φ is saved into the texture, and UV2 can be used to sample this texture in the game to get close to the PBR-based target rendering graph.

In the following, the optimization results after baking the rendering to the texture are described from the aspects of inclusion footprint, memory footprint, and computational overhead.

Figure 17:
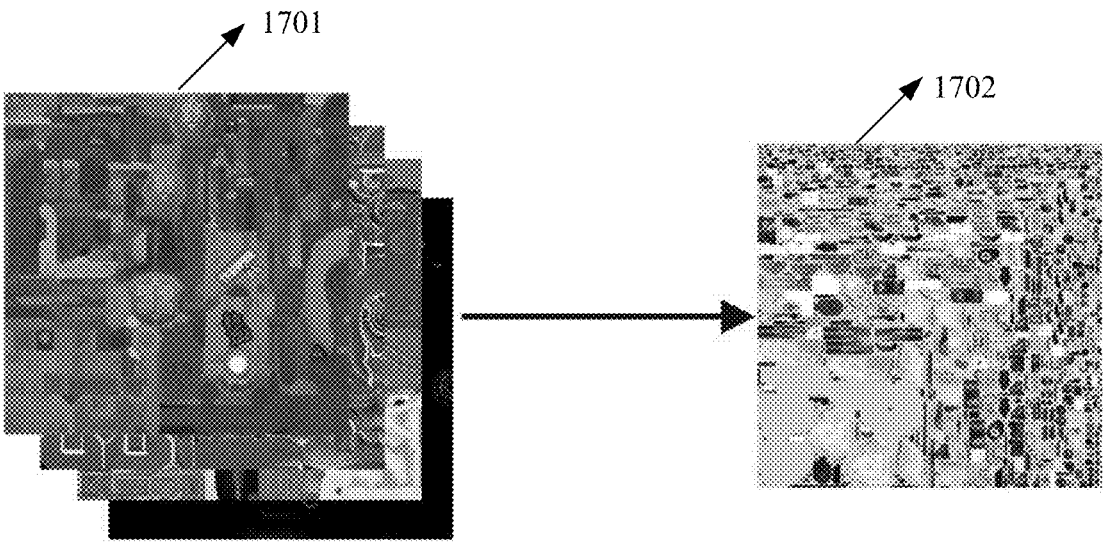
FIG. 17 is a comparative diagram of an inclusion footprint.

As shown in FIG. 17, the original PBR rendering 1701 generally requires 3 to 4 pieces of textures, while the number of textures 1702 fitted with the embodiment of this application has only one piece, so the inclusion footprint has only ¼ to ⅓ of the previous one, thereby reducing the inclusion footprint.

Figure 18:
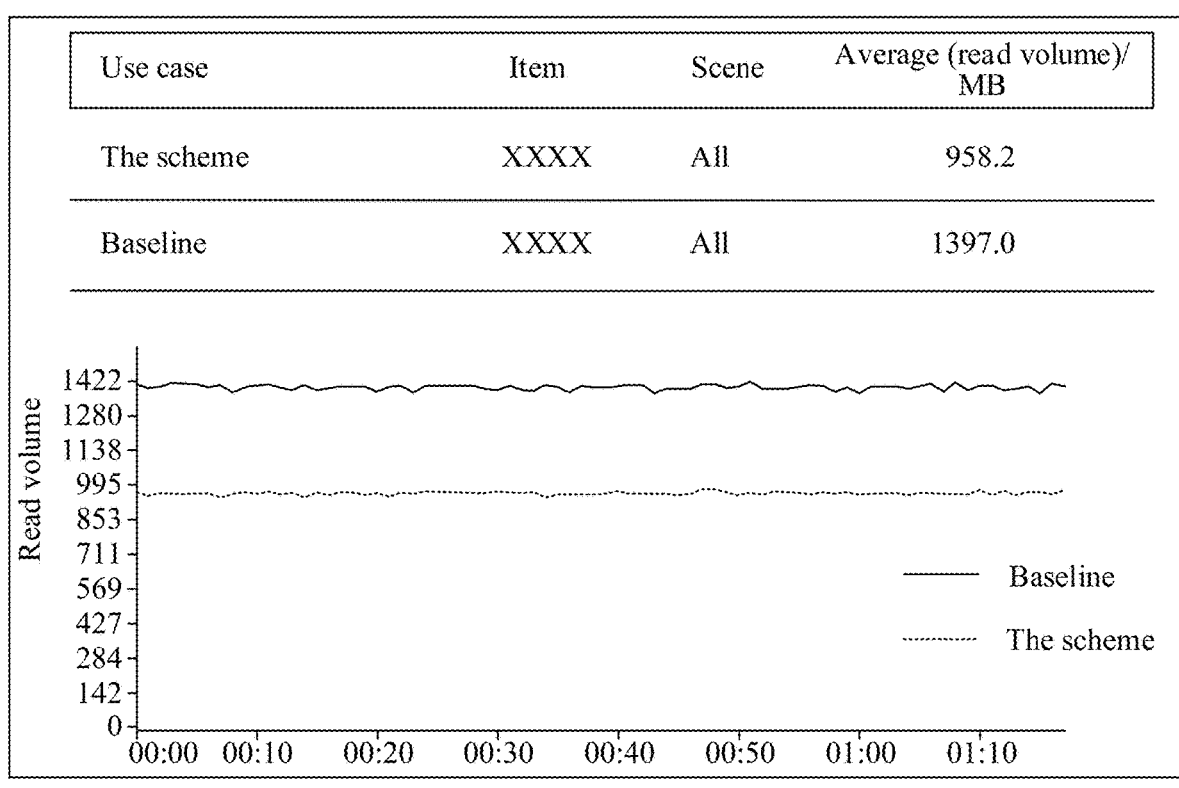
FIG. 18 is a diagram of actual machine test results of a memory footprint.
Figure 19:
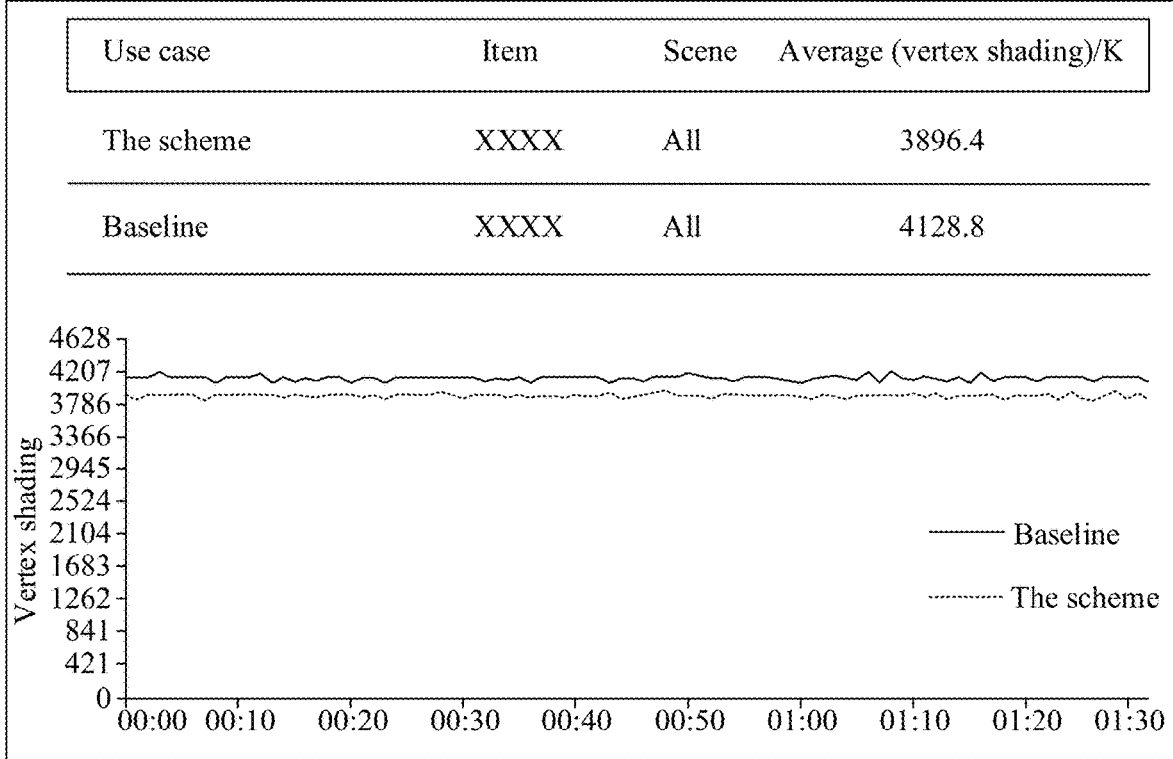
FIG. 19 is a diagram of actual machine test results of a graphics processing unit (GPU) computing overhead.

The actual machine test results of memory occupation are shown in FIG. 18; the actual machine test results of a GPU computing overhead are shown in FIG. 19. The test tool is PerfDog, both the absolute value and the relative value of memory footprint are greatly reduced, and the computational overhead is greatly reduced and the relative value is relatively small.

In summary, the texture fitted by the examples of this application can be directly applied to a mobile-end game, and the rendering effect of approximating the original PBR can be realized with very low overhead, thus greatly improving the frame rate of the game, and improving the rendering efficiency.

Having thus described an image rendering method provided by an embodiment of this application in connection with an exemplary application and implementation of a terminal provided by an embodiment of this application, the following will continue to describe an image rendering solution implemented by various modules in the image rendering apparatus 465 provided by an embodiment of this application.

An acquisition module 4651 is configured to acquire to-be-fitted texture data of a to-be-rendered virtual object. A fitting module 4652 is configured to perform differential fitting processing on the to-be-fitted texture data to obtain fitted texture data. A baking module 4653 is configured to bake the fitted texture data into a texture image to obtain a rendered texture image. A rendering module 4654 is configured to perform, based on the rendered texture image, image rendering processing corresponding to the to-be-rendered virtual object to obtain a rendered virtual object.

In some examples, the fitting module 4652 is further configured to perform standard rendering processing corresponding to the to-be-rendered virtual object to obtain a target rendering graph corresponding to the virtual object. The following iterative processing is performed: performing fitted rendering processing based on the to-be-fitted texture data to obtain a fitted rendering graph; constructing a rendering loss function based on a difference between the target rendering graph and the fitted rendering graph; and updating the to-be-fitted texture data based on the rendering loss function until an iteration end condition is satisfied, and taking the to-be-fitted texture data updated at an end of an iteration as the fitted texture data.

In some examples, the fitting module 4652 is further configured to: acquire a plurality of rendering data of the to-be-rendered virtual object; and perform physical-based rendering processing based on the plurality of rendering data to obtain the target rendering graph corresponding to the virtual object.

In some examples, the fitting module 4652 is further configured to: determine a fitted mapping relationship between texture data and a rendering graph; and map the to-be-fitted texture data based on the fitted mapping relationship to obtain the fitted rendering graph.

In some examples, the fitting module 4652 is further configured to: determine a pixel value difference between the target rendering graph and the fitted rendering graph in a screen space; and determine the rendering loss function based on the pixel value difference and a size of the target rendering graph.

In some examples, the fitting module 4652 is further configured to perform the following processing for any same pixel of the target rendering graph and the fitted rendering graph in the screen space: determining a first pixel value corresponding to the pixel in the fitted rendering graph, and determining a second pixel value corresponding to the pixel in the target rendering graph; taking an absolute value of a difference value between the first pixel value and the second pixel value as a pixel value difference of the pixel; and summing pixel value differences of a plurality of pixels in the target rendering graph as the pixel value difference between the target rendering graph and the fitted rendering graph in the screen space.

In some examples, the fitting module 4652 is further configured to: perform, based on the rendering loss function, partial derivative processing on the to-be-fitted texture data to obtain a gradient of the rendering loss function; and update the to-be-fitted texture data based on the gradient of the rendering loss function to obtain new to-be-fitted texture data.

In some examples, the iteration end condition includes at least one of the following: a value of the rendering loss function being less than a loss threshold; and the number of the iteration reaching a set number.

In some examples, the fitting module 4652 is further configured to: display a setting entry for the iteration end condition; and take the content set by the setting entry as an iteration end condition in response to the setting operation for the setting entry.

In some examples, the fitting module 4652 is further configured to: obtain historical detail degrees of a plurality of historical virtual objects in the virtual scene, one historical virtual object corresponding to at least one historical detail degree; determining a detail degree for rendering the to-be-rendered virtual object based on a plurality of historical detail degrees, types of the detail degree including at least one of the following: a highest historical detail degree; a historical detail degree with a highest application frequency; and a detail degree averaged over the plurality of historical detail degrees; and mapping the detail degree for rendering the to-be-rendered virtual object to obtain the iteration end condition.

In some examples, the fitting module 4652 is further configured to: acquire scene data of a virtual scene; and call, based on the scene data of the virtual scene and the target rendering graph, a condition prediction model to perform condition prediction processing to obtain the iteration end condition, the condition prediction model being obtained by training historical scene data, a historical target rendering graph, and a historical iteration end condition.

In some examples, the rendering module 4654 is further configured to: determine 2D texture coordinates of the to-be-rendered virtual object; and perform, based on the 2D texture coordinates, sampling fitting processing on the rendered texture image to obtain the rendered virtual object.

The examples of this application provide a computer program product or computer program including computer-executable instructions, the computer-executable instructions being stored in a computer-readable storage medium. A processor of an electronic device reads the computer-executable instructions from a computer-readable storage medium, and the processor executes the computer-executable instructions to cause the electronic device to execute the above image rendering method in the examples of this application.

The examples of this application provide a computer-readable storage medium storing thereon computer-executable instructions that, when executed by a processor, cause the processor to execute an image rendering method provided by examples of this application, for example, the image rendering method illustrated in FIGS. 3A to 3B.

In some examples, the computer-readable storage medium may be a memory such as FRAM, ROM, PROM, EPROM, EEPROM, flash memory, magnetic surface storage, optical disk, or CD-ROM; or various devices including one or any combination of the above memories.

In some examples, the computer-executable instructions may be written in any form of program, software, software module, script, or code, in any form of programming language, including compiled or interpreted languages, or declarative or procedural languages. They may be deployed in any form, including as stand-alone programs or as modules, assemblies, subroutines, or other units suitable for use in a computing environment.

As an example, the computer-executable instructions may, but need not, correspond to files in a file system, may be stored in a portion of a file that holds other programs or data, for example, in one or more scripts in a hypertext markup language (HTML) document, in a single file dedicated to the program in question, or in multiple coordinated files (for example, files storing one or more modules, subroutines, or portions of code).

As an example, the computer-executable instructions may be deployed to be executed on one electronic device, or on multiple electronic devices located at one site, or on multiple electronic devices distributed across multiple sites and interconnected by a communication network.

The above is only examples of this application and is not intended to limit the scope of protection of this application. Any modification, equivalent replacement, improvement, and the like made within the spirit and scope of this application shall be included in the scope of protection of this application.

What is claimed is:

1. An image rendering method comprising:

acquiring, by a computing device, texture data of a virtual object;

performing, based on physically based rendering (PBR) processing, a rendering processing corresponding to the virtual object to obtain a target rendering graph corresponding to the virtual object;

iteratively performing differential fitting processing on the texture data to obtain fitted texture data until an iteration end condition is satisfied, wherein the iteration end condition is obtained by:

acquiring historical detail degrees of a plurality of historical virtual objects in a virtual scene;

determining a detail degree for rendering the virtual object based on the historical detail degrees; and determining the iteration end condition based on the detail degree;

baking, based on a rendering loss function value associated with the fitted texture data and the target rendering graph satisfying a threshold, the fitted texture data into a texture image to obtain a rendered texture image; and performing, based on the rendered texture image, image rendering processing corresponding to the virtual object.

2. The method according to claim 1, wherein the iteratively performing differential fitting processing comprises the following iterative processing:

performing fitted rendering processing on the texture data to obtain a fitted rendering graph;

constructing a rendering loss function based on a difference between the target rendering graph and the fitted rendering graph;

updating the texture data based on the rendering loss function until the iteration end condition is satisfied; and selecting the texture data updated at an end of an iteration as the fitted texture data.

3. The method according to claim 1, wherein the performing the rendering processing comprises:

acquiring rendering data of the virtual object.

4. The method according to claim 2, wherein the performing fitted rendering processing comprises:

determining a fitted mapping relationship between texture data and a rendering graph; and mapping the texture data based on the fitted mapping relationship to obtain the fitted rendering graph.

5. The method according to claim 2, wherein the constructing the rendering loss function comprises:

determining a pixel value difference between the target rendering graph and the fitted rendering graph in a screen space; and determining the rendering loss function based on the pixel value difference and a size of the target rendering graph.

6. The method according to claim 5, wherein the determining the pixel value difference comprises:

determining a first pixel value corresponding to a pixel in the fitted rendering graph, and determining a second pixel value corresponding to the pixel in the target rendering graph;

determining a pixel value difference of the pixel based on an absolute value of a difference value between the first pixel value and the second pixel value; and summing pixel value differences of a plurality of pixels in the target rendering graph as the pixel value difference between the target rendering graph and the fitted rendering graph in the screen space.

7. The method according to claim 2, wherein the updating comprises:

performing, based on the rendering loss function, partial derivative processing on the texture data to obtain a gradient of the rendering loss function; and updating the texture data based on the gradient of the rendering loss function.

8. The method according to claim 1, wherein the iteration end condition comprises a number of the iteration reaching a set number.

9. The method according to claim 8, further comprising:

displaying a setting entry of the iteration end condition, wherein the iteration end condition comprises content input through a setting operation for the setting entry.

10. The method according to claim 1, wherein types of the detail degree comprise at least one of the following:

a highest historical detail degree;

a historical detail degree with a highest application frequency; and a detail degree averaged over the historical detail degrees.

11. The method according to claim 8, further comprising:

acquiring scene data of a virtual scene;

training a condition prediction model based on historical scene data, a historical target rendering graph, and a historical iteration end condition; and perform condition prediction processing, based on the scene data of the virtual scene and the target rendering graph, using the condition prediction model to obtain the iteration end condition.

12. The method according to claim 1, wherein the performing image rendering processing comprises:

determining two-dimensional (2D) texture coordinates of the virtual object; and performing, based on the 2D texture coordinates, sampling fitting processing on the rendered texture image to obtain the rendered virtual object.

13. An image rendering apparatus configured to:

acquire texture data of a virtual object;

perform, based on physically based rendering (PBR) processing, a rendering processing corresponding to the virtual object to obtain a target rendering graph corresponding to the virtual object;

iteratively perform differential fitting processing on the texture data to obtain fitted texture data until an iteration end condition is satisfied, wherein the iteration end condition is obtained by:

acquiring historical detail degrees of a plurality of historical virtual objects in a virtual scene;

determining a detail degree for rendering the virtual object based on the historical detail degrees; and determining the iteration end condition based on the detail degree;

bake, based on a rendering loss function value associated with the fitted texture data and the target rendering graph satisfying a threshold, the fitted texture data into a texture image to obtain a rendered texture image; and perform, based on the rendered texture image, image rendering processing corresponding to the virtual object.

14. The image rendering apparatus according to claim 13, wherein the image rendering apparatus is configured to iteratively perform differential fitting processing by performing the following iterative processing:

performing fitted rendering processing on the texture data to obtain a fitted rendering graph;

constructing a rendering loss function based on a difference between the target rendering graph and the fitted rendering graph;

updating the texture data based on the rendering loss function until the iteration end condition is satisfied; and selecting the texture data updated at an end of an iteration as the fitted texture data.

15. The image rendering apparatus according to claim 13, wherein the image rendering apparatus is configured to perform the rendering processing by:

acquiring rendering data of the virtual object.

16. The image rendering apparatus according to claim 14, wherein the image rendering apparatus is configured to perform fitted rendering processing by:

determining a fitted mapping relationship between texture data and a rendering graph; and mapping the texture data based on the fitted mapping relationship to obtain the fitted rendering graph.

17. The image rendering apparatus according to claim 14, wherein the image rendering apparatus is configured to construct the rendering loss function by:

determining a pixel value difference between the target rendering graph and the fitted rendering graph in a screen space; and determining the rendering loss function based on the pixel value difference and a size of the target rendering graph.

18. The image rendering apparatus according to claim 14, wherein the image rendering apparatus is configured to update the texture data by:

performing, based on the rendering loss function, partial derivative processing on the texture data to obtain a gradient of the rendering loss function; and updating the texture data based on the gradient of the rendering loss function.

19. The image rendering apparatus according to claim 13, wherein the iteration end condition comprises at least one of the following:

a value of the rendering loss function being less than a threshold; and a number of the iteration reaching a set number.

20. A non-transitory computer-readable medium storing instructions that, when executed, cause:

acquiring texture data of a virtual object;

performing, based on physically based rendering (PBR) processing, a rendering processing corresponding to the virtual object to obtain a target rendering graph corresponding to the virtual object;

iteratively performing differential fitting processing on the texture data to obtain fitted texture data until an iteration end condition is satisfied, wherein the iteration end condition is obtained by:

acquiring historical detail degrees of a plurality of historical virtual objects in a virtual scene;

determining a detail degree for rendering the virtual object based on the historical detail degrees; and determining the iteration end condition based on the detail degree;

baking, based on a rendering loss function value associated with the fitted texture data and the target rendering graph satisfying a threshold, the fitted texture data into a texture image to obtain a rendered texture image; and performing, based on the rendered texture image, image rendering processing corresponding to the virtual object.

* * * * *